US008799227B2

(12) United States Patent
Ferguson et al.

(10) Patent No.: US 8,799,227 B2
(45) Date of Patent: Aug. 5, 2014

(54) PRESENTING METADATA FROM MULTIPLE PERIMETERS

(75) Inventors: Geordon Thomas Ferguson, Mississauga (CA); Christopher Lyle Bender, Kitchener (CA); Alberto Zubiri, Richmond Hill (CA); Kenneth Cyril Schneider, Blue Mountains (CA); Oliver Whitehouse, Belmont (GB); Christopher William Lewis Hobbs, Ottawa (CA)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 13/398,676

(22) Filed: Feb. 16, 2012

(65) Prior Publication Data
US 2013/0124583 A1 May 16, 2013

Related U.S. Application Data

(60) Provisional application No. 61/558,942, filed on Nov. 11, 2011.

(51) Int. Cl.
*G06F 7/00* (2006.01)
*G06F 17/30* (2006.01)

(52) U.S. Cl.
CPC .............................. *G06F 17/30029* (2013.01)
USPC ........................................................ 707/654

(58) Field of Classification Search
CPC ............................................... G06F 17/30029
USPC ........................................................ 707/654

See application file for complete search history.

(56) References Cited

U.S. PATENT DOCUMENTS

| 4,815,128 A | 3/1989 | Malek |
| 4,837,812 A | 6/1989 | Takahashi et al. |
| 4,945,556 A | 7/1990 | Namekawa |
| 4,972,457 A | 11/1990 | O'Sullivan |
| 4,991,197 A | 2/1991 | Morris |

(Continued)

FOREIGN PATENT DOCUMENTS

| CA | 2505343 | 6/2010 |
| CN | 101523878 | 9/2009 |

(Continued)

OTHER PUBLICATIONS

Google Inc.; Android 2.3.4 User's Guide; May 20, 2011; 384 pages.

(Continued)

*Primary Examiner* — Apu Mofiz
*Assistant Examiner* — Ajith Jacob
(74) *Attorney, Agent, or Firm* — Fish & Richardson P.C.

(57) ABSTRACT

In some implementations, a method for managing data in a user device includes pushing first metadata for a first resource in a first perimeter to a service external to the first perimeter. The first perimeter is configured to prevent external resources from accessing resources in the first perimeter. Second metadata for a second resource in a second perimeter is pushed to the external service. The external service is external to the second perimeter, the second perimeter being configured to prevent external resources from accessing resources in the second perimeter. Information is presented to the user based on a combination of the first metadata and the second metadata.

24 Claims, 10 Drawing Sheets

(56) References Cited

U.S. PATENT DOCUMENTS

| | | |
|---|---|---|
| 5,220,604 A | 6/1993 | Gasser et al. |
| 5,408,520 A | 4/1995 | Clark et al. |
| 5,606,594 A | 2/1997 | Register et al. |
| 5,774,551 A | 6/1998 | Wu et al. |
| 5,802,483 A | 9/1998 | Morris |
| 5,826,265 A | 10/1998 | Van Huben et al. |
| 5,850,515 A | 12/1998 | Lo et al. |
| 5,864,765 A | 1/1999 | Barvesten |
| 5,987,440 A | 11/1999 | O'Neil et al. |
| 5,987,611 A | 11/1999 | Freund |
| 6,052,735 A | 4/2000 | Ulrich et al. |
| 6,088,693 A | 7/2000 | Van Huben et al. |
| 6,105,132 A | 8/2000 | Fritch et al. |
| 6,131,136 A | 10/2000 | Liebenow et al. |
| 6,219,697 B1 | 4/2001 | Lazaridis et al. |
| 6,233,446 B1 | 5/2001 | Do |
| 6,243,756 B1 | 6/2001 | Whitmire et al. |
| 6,253,326 B1 | 6/2001 | Lincke et al. |
| 6,285,889 B1 | 9/2001 | Nykanen et al. |
| 6,292,798 B1 | 9/2001 | Dockter et al. |
| 6,343,313 B1 | 1/2002 | Salesky et al. |
| 6,351,816 B1 | 2/2002 | Mueller et al. |
| 6,360,322 B1 | 3/2002 | Grawrock |
| 6,405,202 B1 | 6/2002 | Britton et al. |
| 6,412,070 B1 | 6/2002 | Van Dyke et al. |
| 6,490,289 B1 | 12/2002 | Zhang et al. |
| 6,516,421 B1 | 2/2003 | Peters |
| 6,647,388 B2 | 11/2003 | Numao et al. |
| 6,668,323 B1 | 12/2003 | Challener et al. |
| 6,745,047 B1 | 6/2004 | Karstens et al. |
| 6,748,543 B1 | 6/2004 | Vilhuber |
| 6,757,821 B1 | 6/2004 | Akiyama et al. |
| 6,772,350 B1 | 8/2004 | Belani et al. |
| 6,775,536 B1 | 8/2004 | Geiger et al. |
| 6,785,810 B1 | 8/2004 | Lirov et al. |
| 6,795,688 B1 | 9/2004 | Plasson et al. |
| 6,795,967 B1 | 9/2004 | Evans et al. |
| 6,886,038 B1 | 4/2005 | Tabbara et al. |
| 6,895,502 B1 | 5/2005 | Fraser et al. |
| 6,901,429 B2 | 5/2005 | Dowling |
| 6,957,330 B1 | 10/2005 | Hughes |
| 6,976,241 B2 | 12/2005 | Cruz et al. |
| 6,978,385 B1 | 12/2005 | Cheston et al. |
| 6,999,562 B2 | 2/2006 | Winick |
| 7,042,988 B2 | 5/2006 | Juitt et al. |
| 7,076,239 B2 | 7/2006 | Kirkup et al. |
| 7,076,797 B2 | 7/2006 | Loveland |
| 7,146,638 B2 | 12/2006 | Malcolm |
| 7,187,678 B2 | 3/2007 | Cunetto et al. |
| 7,246,374 B1 | 7/2007 | Simon et al. |
| 7,315,750 B2 | 1/2008 | Chou et al. |
| 7,330,712 B2 | 2/2008 | Kirkup et al. |
| 7,331,058 B1 | 2/2008 | Gladney |
| 7,400,878 B2 | 7/2008 | Hassan et al. |
| 7,574,200 B2 | 8/2009 | Hassan et al. |
| 7,721,087 B1 | 5/2010 | DiPasquo et al. |
| 7,734,284 B2 | 6/2010 | Adams et al. |
| 7,751,331 B1 | 7/2010 | Blair et al. |
| 7,765,185 B2 | 7/2010 | Rangadass |
| 7,793,355 B2 | 9/2010 | Little et al. |
| 7,869,789 B2 | 1/2011 | Hassan et al. |
| 7,886,053 B1 | 2/2011 | Newstadt et al. |
| 7,921,452 B2 | 4/2011 | Ridlon et al. |
| 8,005,469 B2 | 8/2011 | Adams et al. |
| 8,074,078 B2 | 12/2011 | Brown et al. |
| 8,208,900 B2 | 6/2012 | Adler et al. |
| 8,495,731 B1 | 7/2013 | Mar et al. |
| 8,503,340 B1 | 8/2013 | Xu |
| 2001/0047485 A1 | 11/2001 | Brown et al. |
| 2001/0056549 A1 | 12/2001 | Pinault et al. |
| 2002/0013815 A1 | 1/2002 | Obradovich et al. |
| 2002/0019944 A1 | 2/2002 | Kou |
| 2002/0031230 A1 | 3/2002 | Yu et al. |
| 2002/0087880 A1 | 7/2002 | Rhoades |
| 2002/0095414 A1 | 7/2002 | Barnett et al. |
| 2002/0095497 A1 | 7/2002 | Satagopan et al. |
| 2002/0112155 A1 | 8/2002 | Martherus et al. |
| 2002/0184398 A1 | 12/2002 | Orenshteyn |
| 2003/0005317 A1 | 1/2003 | Audebert et al. |
| 2003/0014521 A1 | 1/2003 | Elson et al. |
| 2003/0026220 A1 | 2/2003 | Uhlik et al. |
| 2003/0031184 A1 | 2/2003 | Cunetto et al. |
| 2003/0035397 A1 | 2/2003 | Haller et al. |
| 2003/0054860 A1 | 3/2003 | Chen |
| 2003/0061087 A1* | 3/2003 | Srimuang .................... 705/8 |
| 2003/0065676 A1 | 4/2003 | Gbadegesin et al. |
| 2003/0070091 A1 | 4/2003 | Loveland |
| 2003/0087629 A1 | 5/2003 | Juitt et al. |
| 2003/0093698 A1 | 5/2003 | Challener et al. |
| 2003/0120948 A1 | 6/2003 | Schmidt et al. |
| 2003/0126437 A1 | 7/2003 | Wheelere et al. |
| 2003/0163685 A1 | 8/2003 | Paatero |
| 2003/0167405 A1 | 9/2003 | Freund et al. |
| 2003/0177389 A1 | 9/2003 | Albert et al. |
| 2003/0226015 A1 | 12/2003 | Neufeld et al. |
| 2003/0236983 A1 | 12/2003 | Mihm, Jr. et al. |
| 2004/0001101 A1 | 1/2004 | Trajkovic et al. |
| 2004/0083382 A1 | 4/2004 | Markham et al. |
| 2004/0097217 A1 | 5/2004 | McClain |
| 2004/0100983 A1 | 5/2004 | Suzuki |
| 2004/0121802 A1 | 6/2004 | Kim et al. |
| 2004/0177073 A1 | 9/2004 | Snyder et al. |
| 2004/0209608 A1 | 10/2004 | Kouznetsov et al. |
| 2005/0154935 A1 | 7/2005 | Jin |
| 2005/0164687 A1 | 7/2005 | DiFazio |
| 2005/0192008 A1* | 9/2005 | Desai et al. ............... 455/435.2 |
| 2005/0210270 A1 | 9/2005 | Rohatgi et al. |
| 2005/0213763 A1 | 9/2005 | Owen et al. |
| 2005/0245272 A1 | 11/2005 | Spaur et al. |
| 2006/0059556 A1 | 3/2006 | Royer |
| 2006/0070114 A1 | 3/2006 | Wood et al. |
| 2006/0090136 A1 | 4/2006 | Miller et al. |
| 2006/0129848 A1 | 6/2006 | Paksoy et al. |
| 2006/0129948 A1 | 6/2006 | Hamzy et al. |
| 2006/0149846 A1 | 7/2006 | Schuba |
| 2006/0156026 A1 | 7/2006 | Utin |
| 2006/0168259 A1 | 7/2006 | Spilotro et al. |
| 2006/0168395 A1 | 7/2006 | Deng et al. |
| 2006/0206931 A1 | 9/2006 | Dillaway et al. |
| 2006/0212589 A1 | 9/2006 | Hayer et al. |
| 2006/0242685 A1 | 10/2006 | Heard et al. |
| 2006/0274750 A1 | 12/2006 | Babbar et al. |
| 2007/0019643 A1 | 1/2007 | Sahheen |
| 2007/0050854 A1 | 3/2007 | Cooperstein et al. |
| 2007/0073694 A1 | 3/2007 | Picault et al. |
| 2007/0156766 A1 | 7/2007 | Hoang et al. |
| 2007/0204153 A1 | 8/2007 | Tome et al. |
| 2007/0204166 A1 | 8/2007 | Tome et al. |
| 2007/0254631 A1 | 11/2007 | Spooner |
| 2007/0277127 A1 | 11/2007 | Carlson et al. |
| 2008/0002726 A1 | 1/2008 | Haung et al. |
| 2008/0028442 A1 | 1/2008 | Kaza et al. |
| 2008/0081609 A1 | 4/2008 | Burgan et al. |
| 2008/0098237 A1 | 4/2008 | Dung et al. |
| 2008/0125146 A1 | 5/2008 | Bainbridge |
| 2008/0130524 A1 | 6/2008 | Volach et al. |
| 2008/0132202 A1 | 6/2008 | Kirkup et al. |
| 2008/0134347 A1 | 6/2008 | Goyal et al. |
| 2008/0137593 A1 | 6/2008 | Laudermilch et al. |
| 2008/0222711 A1 | 9/2008 | Michaelis |
| 2008/0235041 A1 | 9/2008 | Cashdollar et al. |
| 2008/0318616 A1 | 12/2008 | Chipalkatti et al. |
| 2009/0068996 A1 | 3/2009 | Bakker et al. |
| 2009/0070181 A1* | 3/2009 | Loeffen .................... 705/8 |
| 2009/0094668 A1 | 4/2009 | Corbin et al. |
| 2009/0178107 A1 | 7/2009 | Karjoth et al. |
| 2009/0181662 A1 | 7/2009 | Fleischman et al. |
| 2009/0254753 A1 | 10/2009 | De Atley et al. |
| 2009/0260052 A1 | 10/2009 | Bathula et al. |
| 2010/0024016 A1 | 1/2010 | Violleau et al. |
| 2010/0024020 A1 | 1/2010 | Baugher et al. |
| 2010/0081417 A1 | 4/2010 | Hickie |
| 2010/0088753 A1 | 4/2010 | Ayres et al. |
| 2010/0107215 A1 | 4/2010 | Bechtel et al. |

(56) References Cited

U.S. PATENT DOCUMENTS

| | | |
|---|---|---|
| 2010/0153969 A1 | 6/2010 | Dyba et al. |
| 2010/0184440 A1 | 7/2010 | Mao et al. |
| 2010/0222097 A1 | 9/2010 | Gisby et al. |
| 2010/0242086 A1 | 9/2010 | Adams et al. |
| 2010/0274910 A1 | 10/2010 | Ghanaie-Sichanie et al. |
| 2010/0278162 A1 | 11/2010 | Groux et al. |
| 2010/0281487 A1 | 11/2010 | Schneider et al. |
| 2010/0299376 A1 | 11/2010 | Batchu et al. |
| 2010/0299394 A1 | 11/2010 | Jania et al. |
| 2010/0299719 A1 | 11/2010 | Burks et al. |
| 2010/0319053 A1 | 12/2010 | Gharabally |
| 2010/0325221 A1 | 12/2010 | Cohen et al. |
| 2010/0325430 A1 | 12/2010 | Denninghoff |
| 2011/0010699 A1 | 1/2011 | Cooper et al. |
| 2011/0082808 A1 | 4/2011 | Beykpour et al. |
| 2011/0099605 A1 | 4/2011 | Cha et al. |
| 2011/0126214 A1 | 5/2011 | O'Farrell et al. |
| 2011/0145833 A1 | 6/2011 | De Los Reyes et al. |
| 2011/0179083 A1 | 7/2011 | Galloway et al. |
| 2011/0195698 A1 | 8/2011 | Pearce |
| 2011/0210171 A1 | 9/2011 | Brown et al. |
| 2011/0252240 A1 | 10/2011 | Freedman et al. |
| 2011/0314467 A1 | 12/2011 | Pearson |
| 2012/0005477 A1 | 1/2012 | Wei et al. |
| 2012/0005723 A1 | 1/2012 | Chaturvedi et al. |
| 2012/0023573 A1 | 1/2012 | Shi |
| 2012/0054853 A1 | 3/2012 | Gupta et al. |
| 2012/0079110 A1 | 3/2012 | Brown et al. |
| 2012/0079586 A1 | 3/2012 | Brown et al. |
| 2012/0079609 A1 | 3/2012 | Bender et al. |
| 2012/0109826 A1 | 5/2012 | Kobres |
| 2012/0131685 A1 | 5/2012 | Broch et al. |
| 2012/0144196 A1 | 6/2012 | Owen et al. |
| 2012/0157166 A1 | 6/2012 | Kim et al. |
| 2012/0202527 A1 | 8/2012 | Obradovich et al. |
| 2012/0210443 A1 | 8/2012 | Blaisdell et al. |
| 2012/0214442 A1 | 8/2012 | Crawford et al. |
| 2012/0214503 A1 | 8/2012 | Liu et al. |
| 2012/0278863 A1 | 11/2012 | Wallace et al. |
| 2012/0278904 A1 | 11/2012 | Perez et al. |
| 2012/0291140 A1 | 11/2012 | Robert et al. |
| 2012/0309344 A1 | 12/2012 | Ferrazzini et al. |
| 2013/0074142 A1 | 3/2013 | Brennan et al. |
| 2013/0097657 A1 | 4/2013 | Cardamore et al. |
| 2013/0174222 A1 | 7/2013 | Ogle |
| 2013/0219465 A1 | 8/2013 | Tse et al. |
| 2013/0346606 A1 | 12/2013 | Ryerson et al. |

FOREIGN PATENT DOCUMENTS

| | | |
|---|---|---|
| EP | 605106 | 7/1994 |
| EP | 973350 | 1/2000 |
| EP | 1168141 | 1/2002 |
| EP | 1471691 | 10/2004 |
| EP | 1596410 | 11/2005 |
| EP | 1624428 | 2/2006 |
| EP | 1806674 | 7/2007 |
| EP | 1563663 | 10/2008 |
| EP | 2337300 | 6/2011 |
| GB | 2378780 | 2/2003 |
| GB | 2408179 | 5/2005 |
| GB | 2440015 | 1/2008 |
| JP | 2000-253241 | 9/2000 |
| JP | 2001-077811 | 3/2001 |
| JP | 2001-203761 | 7/2001 |
| JP | 2002-288087 | 10/2002 |
| WO | 96/25828 | 8/1996 |
| WO | 99/005814 | 2/1999 |
| WO | 00/59225 | 10/2000 |
| WO | 00/60434 | 10/2000 |
| WO | 2004017592 | 2/2004 |
| WO | 2004043031 | 5/2004 |
| WO | 2005045550 | 5/2005 |
| WO | 2006/130807 | 12/2006 |
| WO | 2007048251 | 5/2007 |
| WO | 2009/012329 | 1/2009 |
| WO | 2009014975 | 1/2009 |
| WO | 2012109497 | 1/2009 |
| WO | 2009021200 | 2/2009 |
| WO | 2012037656 | 3/2012 |
| WO | 2012037657 | 3/2012 |
| WO | 2012037658 | 3/2012 |

OTHER PUBLICATIONS

Microsoft Corp.; Microsoft Outlook 2010; Released Jul. 15, 2010; 27 pages.

Office Action issued in U.S. Appl. No. 13/293,743 on Feb. 14, 2013; 15 pages.

Office Action issued in U.S. Appl. No. 13/274,913 on Jan. 23, 2013; 22 pages.

International Search Report and Written Opinion issued in International Application No. PCT/CA2012/050797 on Feb. 5, 2013; 8 pages.

View messages with restricted permission sent by using IRM; Support/Outlook/Outlook 2007 Help and How-to. http://office.mircosoft.com/en-us/outlook-help/view-messages-with-restricted-permission-sent-by-using-irm-HA010246115.as . . . , pp. 1-2, retrieved on Feb. 12, 2010.

Send an e-mail message with restricted permission by using IRM; Support/Outlook/Outlook 2007 Help and How to. http://office.mircosoft.com/en-us/outlook-help/send-an-e-mail-message-with-restricted-permission-by-using-irm-HA01024780 . . . , pp. 1-4, retrieved on Feb. 12, 2010.

Introduction to using IRM for e-mail messages; Support/Outlook/Outlook 2007 Help and How-to. http://office.microsoft.com/en-us/outlook-help/introduction-to-using-irm-for-e-mail-message-HA010100366.aspx?CTT=5 . . . , pp. 1-6, retrieved on Feb. 12, 2010.

EP Application No. 12155659.1, Extended European Search Report dated Jan. 8, 2012.

Smartphone Security Beyond Lock and Wipe (Jun. 10, 2010): http://www.enterprisemobiletoday.com/article.php/3887006.

Basic Access Authentication (Jan. 23, 2010): http://en.wikipedia.org/wiki/Basic_access_authentication.

Digital Access Authentication (Dec. 23, 2009): http://en.wikipedia.org/wiki/Digest_access_authentication.

Cross-site request forgery (Nov. 30, 2008): http://en.wikipedia.org/wiki/Cross-site_request_forgery.

Extended European Search Report mailed Jul. 13, 2012, in corresponding European patent application No. 12153439.0.

"Customizing User Interaction in Smart Phones", Pervasive Computing, IEEE CS (2006) pp. 81-90 (URL: http://www.idi.ntnu.no/grupperlsu/bibliography/pdf/2006/Korpipaa2006pc.pdf).

"Supporting Mobile Privacy and Security through Sensor-Based Context Detection", Julian Seifert, Second International Workshop on Security and Privacy in Spontaneous Interaction and Mobile Phone Use, May 17, 2010, Finland (U RL: http://www.medien.ifi.lmu.de/iwssi2010/papers/iwssi-spmu201O-seifert.pdf).

Owen, Russell N., U.S. Appl. No. 10/524,353; filed: Feb. 14, 2005; Title: System and Method for Secure Control of Resources of Wireless Mobile Communication Device.

International Application No. PCT/CA 03101245, International Search Report dated Dec. 23, 2003.

International Application No. PCT/CA 03101245, PCT Written Opinion, dated Apr. 23, 2004.

International Application No. PCT/CA 03101245, PCT Written Opinion, dated Sep. 20, 2004.

International Application No. PCT/CA 03101245, PCT International Preliminary Examination Report, dated Nov 29, 2004.

Owen, Russell N., U.S. Appl. No. 13/371,093; filed: Feb. 10, 2012; Title: System and Method for Secure Control of Resources of Wireless Mobile Communication Devices Secure Control of Resources of Wireless Mobile Communication Device.

Red Hat: "Red Hat Linux 7.2—The Official Red Had Linux Reference Guide" Red Hat Linux Manuals, Online!, Oct. 22, 2001, XP002276029, pp. 145-155.

Bender, Christopher Lyle; U.S. Appl. No. 13/074,136; filed Mar. 29,

(56) References Cited

OTHER PUBLICATIONS

2011; Title: Data Source Based Application Sandboxing.
"A Technical Overview of the Lucent VPN Firewall" White Paper Lucent Technologies, XX, XX, Aug. 2002, pp. 1-35, XP002271173, Chapter 1.
European Search Report of Appln. No. 04256690.1-2412, date of mailing Apr. 6, 2005—9 pgs.
Fourth Office Action. Chinese Application No. 200380105435.2. Dated: Aug. 3, 2011.
Patent Certificate. Indian Patent Application No. 1956/DELNP/2005. Dated: Oct. 31, 2003.
Certificate of Grant of Patent. Singapore Patent No. 112419. Dated: Apr. 30, 2007.
Certificate of Grant of Patent. Hong Kong Patent No. 1080315. Dated: Apr. 24, 2009.
Notice of Allowance. Canadian Application No. 2,505,343. Dated: Sep. 15, 2009.
Extended European Search Report issued in European Application No. 12189805.0 on Apr. 16, 2013; 6 pages.
Office Action issued in U.S. Appl. No. 11/118,791 on Sep. 25, 2006; 11 pages.
Office Action issued in U.S. Appl. No. 11/118,791 on Nov. 28, 2007; 12 pages.
Office Action issued in U.S. Appl. No. 11/118,791 on Mar. 30, 2007; 12 pages.
Office Action issued in U.S. Appl. No. 11/118,791 on May 20, 2008; 13 pages.
Office Action issued in U.S. Appl. No. 11/118,791 on Jan. 27, 2009; 16 pages.
Office Action issued in U.S. Appl. No. 11/118,791 on Apr. 8, 2009; 14 pages.
Advisory Action issued in U.S. Appl. No. 11/118,791 on Jun. 26, 2009; 8 pages.
Notice of Allowance issued in U.S. Appl. No. 11/118,791 on Jan. 20, 2010; 4 pages.
Office Action issued in U.S. Appl. No. 12/795,252 on Aug. 6, 2010; 6 pages.
Notice of Allowance issued in U.S. Appl. No. 12/795,252 on Dec. 17, 2010; 4 pages.
Notice of Allowance issued in U.S. Appl. No. 12/795,252 on Apr. 14, 2011; 4 pages.
Examiner's First Report issued in Australian Application No. 2005239005 on Oct. 15, 2007; 2 pages.
Examiner's Report No. 2 issued in Australian Application No. 2005239005 on Jul. 15, 2009; 2 pages.
Examiner's First Report issued in Australian Application No. 2009202857 on Nov. 5, 2010; 3 pages.
Office Action issued in Canadian Application No. 2,564,914 on May 3, 2010; 4 pages.
Office Action issued in Canadian Application No. 2,564,914 on Apr. 4, 2011; 2 pages.
First Office Action issued in Chinese Application No. 200580013730.4 on Mar. 27, 2009; 9 pages.
Second Office Action issued in Chinese Application No. 200580013730.4 on Dec. 12, 2010; 10 pages.
Third Office Action issued in Chinese Application No. 200580013730.4 on Mar. 8, 2011; 10 pages.
Notice of Allowance issued in Chinese Application No. 200580013730.4 on Jul. 28, 2011; 4 pages.
European Supplementary Search Report issued in European Application No. 05738877.9 on Sep. 13, 2007; 3 pages.
Communication Pursuant to Article 94(3) EPC issued in European Application No. 05738877.9 on Jan. 15, 2008; 4 pages.
Communication Pursuant to Article 94(3) EPC issued in European Application No. 05738877.9 on Jul. 15, 2009; 4 pages.
Communication under Rule 71(3) EPC issued in European Application No. 05738877.9 on Sep. 17, 2010; 41 pages.
First Examination Report issued in Indian Application No. 6068/DELNP/2006 on Jun. 3, 2010; 2 pages.

Notice of Reasons for Rejection issued in Japanese Application No. 2007-509840 on Jun. 15, 2009; 5 pages.
Notice of Allowance issued in Japanese Application No. 2007-509840 on Jan. 25, 2010; 3 pages.
Notice Requesting Submission of Opinion issued in Korean Application No. 10-2006-7025081 on Nov. 16, 2007; 10 pages.
Notice of Decision of Final Rejection issued Korean Application No. 10-2006-7025081 on Jun. 18, 2008.
Trial Decision issued in Korean Application No. 10-2006-7025081 on Jul. 27, 2009; 10 pages.
Notice of Decision for Patent issued in Korean Application No. 10-2006-7025081 on Aug. 7, 2009; 3 pages.
International Search Report issued in International Application No. PCT/CA2005/000652 on Aug. 17, 2005; 9 pages.
International Preliminary Report on Patentability under Chapter I issued in International Application No. PCT/CA2005/000652 on Nov. 9, 2006; 6 pages.
Office Action issued in U.S. Appl. No. 13/659,527 on May 23, 2013; 8 pages.
Office Action issued in U.S. Appl. No. 13/722,213 on May 22, 2013; 8 pages.
Office Action issued in Canadian Application No. 2,769,646 on Jun. 5, 2012; 3 pages.
Office Action issued in Canadian Application No. 2,769,646 on Oct. 22, 2012; 2 pages.
International Search Report and Written Opinion of the International Searching Authority issued in International Application No. PCT/CA2011/050707 on Jan. 18, 2012; 7 pages.
International Preliminary Report on Patentability issued in International Application No. PCT/CA2011/050707 on May 30, 2013; 4 pages.
Office Action issued in U.S. Appl. No. 13/293,743 on Sep. 20, 2013; 19 pages.
Office Action issued in U.S. Appl. No. 13/274,913 on Jul. 16, 2013.
Office Action issued in U.S. Appl. No. 13/25,097 on Sep. 10, 2013; 21 pages.
Office Action issued in U.S. Appl. No. 13/098,456 on Apr. 17, 2013; 31 pages (39524-US-PAT).
Office Action issued in U.S. Appl. No. 13/098,456 on Sep. 27, 2013; 28 pages (39824-US-PAT).
Communication Pursuant to Article 94(3) EPC issued in European Application No. 11188696.6 on Jul. 9, 2013; 4 pages.
Office Action issued in U.S. Appl. No. 10/524,353 on Sep. 21, 2012.
Owen, Russell N., U.S. Appl. No. 10/524,353; filed: Aug. 19, 2003; Title: System and Method for Secure Control of Resources of Wireless Mobile Communication Devices.
Research in Motion, "BlackBerry Bridge App 2.1 and Blackberry PlayBook Tablet 2.1, Security Technical Overview"; Version: 2.1; Jul. 17, 2012; 43 pages.
Research In Motion, "BlackBerry Device Service 6.1 and BlackBerry PlayBook Tablet 2.1, Security Technical Overview"; Version: 6.1; Sep. 17, 2012; 90 pages.
Office Action issued in U.S. Appl. No. 10/524,353 on Sep. 21, 2012; 16 pages (10742-US-PCT). (10742-US-PCT).
Office Action issued in U.S. Appl. No. 13/098,456 on Sep. 13, 2012; 20 pages (39524-US-PAT).
International Search Report and Written Opinion issued in Internationl Application No. PCT/CA2011/001058 on Dec. 21, 2011; 9 pages (39524-WO-PCT).
XP002167366, Chen, Zhigun; "Java Card Technology for Smart Cards: Architecture and Programmer's Guide"; "Applet Firewall and Object Sharing;" Internet citation; Jun. 2, 2000; <http://developer.java.sun.com/developer/Books/consumerproducts/javacard/ch09.pdf>.
Ferguson et al., U.S. Appl. No. 13/293,743, "Managing Cross Perimeter Access," filed Nov. 10, 2011.
Extended European Search Report issued in European Application No. 11186802.2 on Jan. 18, 2012; 7 pages.
Extended European Search Report issued in European Application No. 11186796.6 on Jan. 18, 2012; 8 pages.
Extended European Search Report issued in European Application No. 11188696.6 on Apr. 12, 2012; 7 pages.

(56) References Cited

OTHER PUBLICATIONS

Office Action issued in U.S. Appl. No. 13/25,097 on Feb. 28, 2013; 18 pages.
Extended European Search Report issued in European Application No. 12189773.0 on Mar. 7, 2013; 8 pages.
International Search Report and Written Opinion of the International Searching Authority issued in International Application No. PCT/CA2012/050796 on Feb. 21, 2013; 13 pages.
Microsoft Office: Microsoft Outlook 2010 Product Guide; Microsoft Corp.; published in 2010; 65 pages.
Windows 7 Product Guide; Microsoft Corp.; published in 2009; 140 pages.
Extended European Search Report issued in European Application No. 12173030.3 on Nov. 22, 2012; 6 pages.
IETF RFC 3530; "Network File System (NFS) Version 4 Protocol"; Apr. 2003.
"Secure Inter-Process Communication"; Apr. 4, 2004. Retrieved from internet on Jan. 20, 2014 https://web.archive.org/web/20040404015137/http://cr.yp.to/docs/secureipc.html.
Examiner's First Report issued in Australian Application No. 2012203391 on Jan. 22, 2014; 4 pages.
International Preliminary Report on Patentability under Chapter II issued in International Application No. PCT/CA2012/050797 on Feb. 12, 2014; 13 pages.
Notice of Allowance issued in U.S. Appl. No. 13/490,956 on Dec. 4, 2013; 8 pages.
Office Action issued in U.S. Appl. No. 13/296,963 on Nov. 18, 2013; 23 pages.
Advisory Action issued in U.S. Appl. No. 13/293,743 on Nov. 26, 2013; 3 pages.
Office Action issued in U.S. Appl. No. 13/274,913 on Jan. 2, 2014.
Advisory Action issued in U.S. Appl. No. 13/275,097 on Dec. 6, 2013; 4 pages.
EagleVision: A Pervasive Mobile Device Protection System, Ka Yang, Nalin Subramanian, Daji Qiao, and Wen sheng Zhang, Iowa State University (URL: http://www.cs.iastate.edu/-wzhang/papers/eagleVision.pdf) Jul. 13-16, 2009.
"Using context-profiling to aid access control decisions in mobile devices", Gupta et al., Nokia Research Center (URL: http://www.cerias.purdue.edu/assets/symposium/2011-posters1372-C48.pdf) Please refer to the I-page file named 372-C48.pdf; 2011.
Sygate: "Sygate Personal Firewall PRO User Guide" Sygate Personal Firewall Pro User Guide version 2.0; 2001, pp. 1-77, XP002248366.
Int'l Search Report and the Written Opinion of the Int'l Searching Authority, or the Declaration of Appln. Serial No. PCT/CA2004/000250 of Feb. 20, 2004—12 pgs.
International Search Report issued in International Application No. PCT/CA03/01679 on May 6, 2004—6 pgs.
Notice of Allowance issued in U.S. Appl. No. 13/659,527 on Oct. 7, 2013; 15 pages.
Office Action issued in U.S. Appl. No. 13/722,213 on Dec. 4, 2013; 6 pages.
Notice of Allowance issued in U.S. Appl. No. 13/722,213 on Jan. 29, 2014; 7 pages.
Notice of Allowance issued in Canadian Application No. 2,769,646 on Feb. 15, 2013; 1 page.
Office Action issued in Canadian Application No. 2,564,914 on Dec. 3, 2013; 2 pages.
Office Action issued in Chinese Application No. 201110308441.4 on Oct. 25, 2013; 9 pages.
Office Action issued in U.S. Appl. No. 13/529,509 on Mar. 25, 2014.
International Preliminary Report on Patentability under Ch. II issued in International Application No. PCT/CA2012/050796 on Mar. 10, 2014; 18 pages.

\* cited by examiner

US 8,799,227 B2

PRESENTING METADATA FROM MULTIPLE PERIMETERS

CLAIM OF PRIORITY

This application claims priority under 35 USC §119(e) to U.S. Patent Application Ser. No. 61/558,942, filed on Nov. 11, 2011, the entire contents of which are hereby incorporated by reference.

TECHNICAL FIELD

This invention relates to presenting metadata from multiple perimeters.

BACKGROUND

In many instances, computational devices may include data, applications, and/or network resources whose accessibility is controlled by security protocols. For example, the security protocols may include user accounts, administration rights, password protection, database management, and others. Though, resources associated with different enterprises and users may require different secured accessibility.

DESCRIPTION OF DRAWINGS

Like reference symbols in the various drawings indicate like elements.

DETAILED DESCRIPTION

Figure 1:
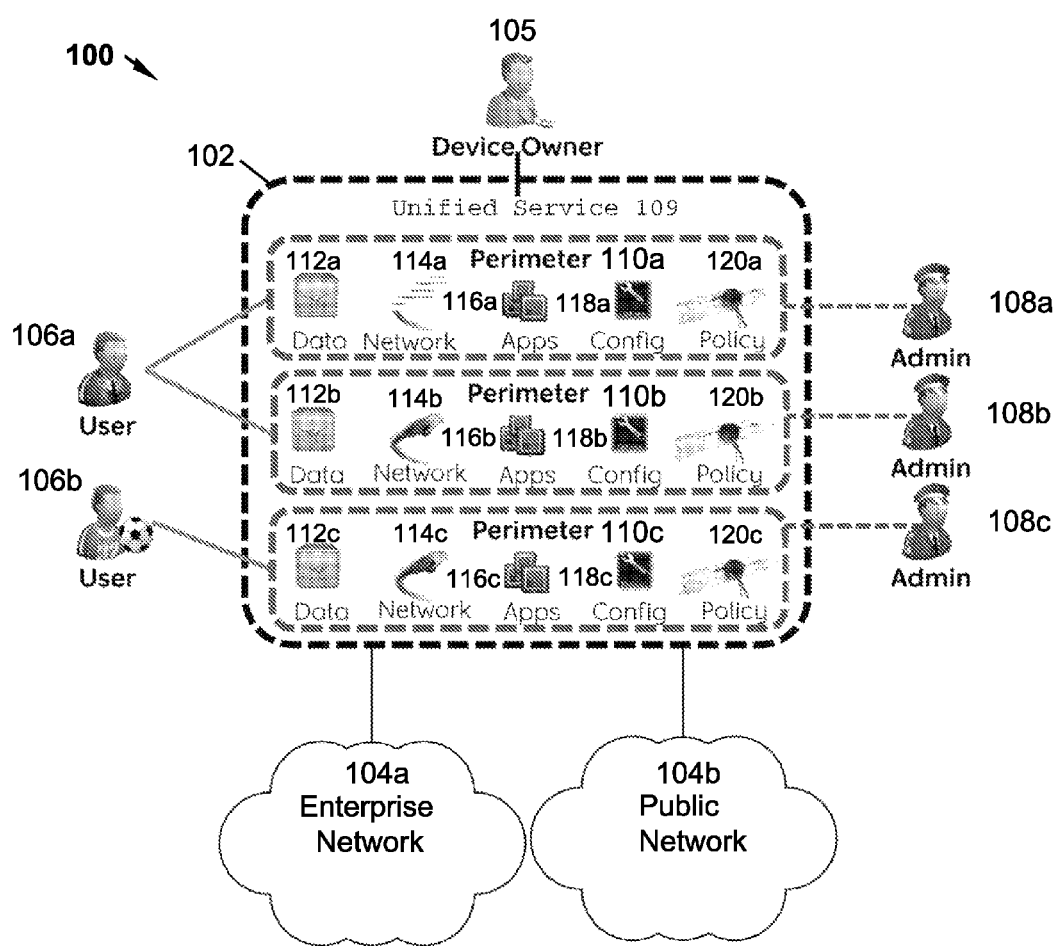
FIG. 1 is a block diagram of an example communication system environment for generating perimeters.

This disclosure provides details and examples of presenting metadata from different perimeters through a unified interface. For example, calendar applications assigned to different perimeters may push or otherwise provide times and dates of personal and corporate appointments to a unified application and the unified application may present this information in a single interface. This single-interface solution may be included in the larger perimeters solution, which logically isolates groups of resources in different perimeters of a single device. For example, as discussed in more detail below, perimeters may be configured to keep corporate data, applications, network resources, configuration files, policies, or others separate from personal data, applications, network resources, configuration files, policies, or other personal resources. By combining information from different perimeters, the user may view related information (e.g., appointments, contacts) through a single display. In contrast, the calendar view may be significantly degraded if there were no ability to show a unified view and would force users to view separate calendars (e.g., personal and corporate). The amalgamation of the data would have to be performed manually, which makes the device cumbersome and less useful.

In some implementations, the unified interface may enable information from each of the various perimeters to be displayed in a unified interface by allowing them to explicitly publish a subset of relevant data to the underlying service. In some implementations, the user may select data types to push to the unified application or otherwise opt-in the unified interface. For example, in the case of a calendar, a given perimeter's calendar may simply publish meeting times with no subject or other information. This limited information may allow a unified calendar view to present the meeting appropriately placed on the unified calendar without exposing any further data about the meeting to the unified view. In order to view additional data, the unified viewer may invoke the perimeter's local item viewer with the appropriate item. In this way, the item's details are maintained within the boundaries of the perimeter (with exception of the metadata that was published to the unified view).

In general, a perimeter may generally refer to a logical separation of resources, such as applications, stored data and/or network access. Resources included in a perimeter may be encrypted and password protected to securely separate those resources from resources in different perimeters. For example, resources in one perimeter may be prohibited from accessing resources in a different perimeter. In some implementations, perimeters may include personal perimeters and enterprise perimeters (or corporate perimeters). A personal perimeter may generally refer to a perimeter created by default for a user and managed by the same or a different user through a wireless communication device. An enterprise perimeter may generally refer to a perimeter created for or by a user and managed by a remote management server (e.g., a BlackBerry Enterprise Server (BES)). The personal perimeter may provide permission to be accessed by personal applications, and the enterprise perimeter, when unlocked by the user, may provide permission to be accessed by enterprise applications.

FIG. 1 is an example communication system 100 for presenting metadata from multiple perimeters in accordance with the present disclosure. For example, the system 100 may push metadata from different perimeters to an external service and generate a single unified view identifying the metadata. Prior to pushing metadata, the system 100 may receive settings that identify types of metadata to push to the external service and, in response to data updates, determine whether to push metadata to the unified services external to the perimeters. In some implementations, the system 100 may execute one or more of the following: present, in each corresponding perimeter, a request to identify types of metadata to push to a unified service; receive selection of metadata types for each corresponding perimeter; generate or update one or more rules for pushing metadata from a perimeter to the external unified service; identify an update associated with a selected metadata type in a perimeter; identify one or more rules for pushing data in response to data updates; determine whether to push data to the external unified service; in response to a trigger event, generate an interface for the unified service; generate graphical elements for the metadata received from the different perimeters; incorporate the graphical elements in the generated interface; present the interface to convey combined metadata received from different perimeters in a single unified interface; or others. By presenting metadata from different interfaces into a single interface, the system 100 may present some information from different perimeters in a single view without conveying other information.

As for a high-level description of system elements, the communication system 100 includes a wireless communication device 102 communicably coupled to networks 104a and 104b (individually and collectively referred to as 104). In addition, the wireless communication device 102 may interact with a device owner 110, one or more users 106a and 106b (individually and collectively referred to as 106), one or more administrators 108a, 108b, and 108c (individually and collectively referred to as 108), a combination of the foregoing, or others. The wireless communication device 102 includes a unified service 109 for combining metadata from different perimeters 110a-c, and each perimeter 110 includes data 112, network access resource 114 for providing access to networks, one or more applications 116 for providing services to users 106, configuration files 118 for configuring resources, and one or more policies 120 for defining policies for pushing metadata to the unified service 109. As for a high-level description of operation, the device 102 presents a request to identify metadata types to push to the unified service 109 in each of the perimeters 110. In response to receiving selections, the device 102 updates management policies 120 to define rules for pushing metadata to the unified service 109. The device 102 identifies an update to data 112 in a perimeter 110 and associated with an application 116 (e.g., calendar application) and identifies a management policy 120 associated with the data 112. The device 102 determines whether to push metadata associated with the data 112 to the unified service 109 based on the identified policy 120. In connection with accessing the unified service 109, the unified service 109 generates a single unified interface and populates the single unified interface with graphical elements conveying or otherwise identifying metadata from different perimeters 110.

Turning to a more detailed description of the elements of the communication system 100, the wireless communication device 102 may be computing device operable to receive requests from the user via a user interface, such as a Graphical User Interface (GUI), a CLI (Command Line Interface), or any of numerous other user interfaces. Thus, where reference is made to a particular interface, it should be understood that any other user interface may be substituted in its place. In various implementations, the wireless communication device 102 comprises an electronic computing device operable to receive, transmit, process and store any appropriate data associated with the communication system 100. As used in this disclosure, the wireless communication device 102 is intended to encompass any electronic device and/or computing device that has wireless communication capability. For example, the wireless communication device 102 may comprise a tablet computer, a personal computer, a laptop computer, touch screen terminal, workstation, network computer, kiosk, wireless data port, wireless or wireline phone, personal data assistant (PDA), smartphone, at least one processor within these or other devices, or any other suitable processing device. For example, the wireless communication device 102 may comprise a wireless communication device that includes an input device, such as a keypad, touch screen, mouse, or other device that can accept information, and an output device that conveys information associated with the operation of the resources, including digital data, visual information, or GUI. Both the input device and output device may include fixed or removable storage media such as a magnetic computer disk, CD-ROM, or other suitable media to both receive input from and provide output to users of terminals 106 through the display, such as a GUI. In addition, the device 102 may also include less or more perimeters 110 as compared with the three illustrated perimeters 110. In some implementations, the wireless communication device 102 may include at least one personal perimeter for out-of-the-box operation. Based on validating the identity of the user 106 for accessing the enterprise account, the user 106 may be authenticated to use services and/or access resources associated with the enterprise perimeter 110. The enterprise server may automatically generate policies on the wireless communication device 102. As illustrated, the device 102 includes the unified service 109 and the perimeters 110a-c.

The unified service 109 may comprise any application, program, module, process, or other software that may execute, change, delete, generate, or otherwise manage metadata from the different perimeters. For example, the unified service 109 may be an application and may receive metadata from applications 116 providing the same type of service. Application types may include a calendar application, an email application, contacts application, or others. In other words, a unified calendar service 109 may receive metadata from applications 116a-c identifying, for example, date and times for appointments. In some implementations, the unified service 109 may execute one or more of the following: receive metadata from perimeters 110; combine received metadata from the different perimeters 110; generate a single unified interface in response to a user request; generate graphical elements identifying the metadata; populate the unified interface with the graphical elements to convey metadata from different perimeters 110 through a single interface; in response to a user selection, submit a request to an application 116 to present additional details associated with presented metadata; or others. In short, the unified service 109 may present data from different perimeters 110 through a single interface. Alternatively or in addition, the unified service 109 may evaluate user input based on metadata combined from different perimeters 110. For example, the unified service 109 may combine dates and times for appointments from different perimeters 110 and determine whether scheduling an appointment conflicts with the combined dates and times.

The perimeter 110 may include password protection, encryption, and other process for controlling access to resources assigned to the perimeter or internal resources. A perimeter 110 may be generated by the device owner 104, a user 106, an administrator 108, or others. In some examples, the perimeter 110a may be a personal perimeter created by default for the user 106a and managed by the user 106a. In some examples, the perimeter 110a may be an enterprise perimeter created by an administrator 108a for an enterprise and may be managed by a remote management server. In some implementations, each personal perimeter 110 may be associated with a personal account, and each enterprise perimeter 110 may be associated with an enterprise account. In addition, a given perimeter 110 may be accessed by the device owner 104, a user 106, an administrator 108, a combination of the foregoing, or others. In some implementations, each perimeter may be associated with a single user 106; while each user 106 may access multiple device perimeters 110. For example, the user 106a may access resources within both the perimeter 110a and the perimeter 110b. The user 106b may have access to resources in only one perimeter 110c. The device owner 105 may have the ability to remove individual perimeters 110 from the wireless communication device 102. In some implementations, the user 106 may set up or log in to an enterprise account via a user interface. As described previously, the enterprise account may be an account that pushes data to the device 102 (e.g., ActiveSync). When the wireless communication device 102 accesses the account, the perimeter 110 may include policies identifying one or more security settings for the enterprise account. These policies may be at least one of maintained or enforced by an enterprise server (not shown) residing in an enterprise network (or corporate network) 104a. While the perimeters 110 are illustrated as including all aforementioned resources such as data 112, network access resource 114, one or more applications 116, one or more configuration files 118, and one or more policies 120, the perimeters 110 may include some, all or different resources without departing from the scope of the disclosure.

As illustrated, a perimeter 110 may include data 112, network access resource 114, applications 116, configuration files 118, a policy 120, a combination of the foregoing, or other resources. The data 112 may include various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the wireless communication device 102 and its applications 116. Additionally, the data 112 may include any other appropriate data, such as data associated with VPN applications, firmware logs and policies, firewall policies, a security or access log, print or other reporting files, as well as others. The data 112 may be stored in any memory or database module and may take the form of volatile or non-volatile memory including, without limitation, magnetic media, optical media, random access memory (RAM), read-only memory (ROM), removable media, or any other suitable local or remote memory component.

The network access resource 114 may include any parameters, variables, policies, algorithms, instructions, settings, or rules for granting access to the network 102a or 102b or other network. For example, the network access resource 114 may include or identify firewall policies for accessing the enterprise network 104a. In some implementations, the network access resources 114 include or otherwise identify one or more of the following: a username; a password; a security token; a Virtual Private Network (VPN) configuration; firewall policies; a communication protocol; encryption key certificates, or others.

The applications 116 may comprise any application, program, module, process, or other software that may execute, change, delete, generate, or otherwise manage business information according to the present disclosure. For example, the application 116 may include a notification application, contacts application, calendar applications, messaging applications, or others. Further, while illustrated as internal to the wireless communication device 102, one or more processes associated with the application 116 may be stored, referenced, or executed remotely. For example, a portion of the application 116 may be an interface to a web service that is remotely executed. Moreover, the application 116 may be a child or sub-module of another software module or enterprise application (not illustrated) without departing from the scope of this disclosure. In some implementations, the application 116 may be a hosted solution that allows multiple parties in different portions of the process to perform the respective processing. For example, the enterprise network 102 may access the application 116 on the wireless communication device 102 or even as a hosted application located over network 102b without departing from the scope of this disclosure. In another example, portions of the application 116 may be used by the user 106 working directly at the wireless communication device 102, as well as remotely via enterprise network 102a. In some implementations, the applications 116 may be configured to access at least one of a personal perimeter 110 or an enterprise perimeter 110, which may be referred to as dual mode applications or hybrid mode applications. A dual mode application 116 may access either a personal perimeter 110 or an enterprise perimeter 110. A hybrid mode application 116 may access both a personal perimeter 110 and an enterprise perimeter 110.

The configuration files 118 may include any parameters, variables, policies, algorithms, instructions, settings, or rules for configuring software of the wireless communication device 102. For example, the configurations 118 may include a table that identifies settings for one or more applications 116. In some implementations, the configuration file 118 identifies initial settings for one or more applications 116. In addition to user applications 116, the configuration file 118 may identify settings for other types of applications such as operating system settings. The files 118 are often written in ASCII (rarely UTF-8) and line-oriented, with lines terminated by a newline or carriage return/line feed pair, depending on the operating system.

The policy 120 may include any parameters, variables, policies, algorithms, instructions, settings, or rules for pushing metadata to the unified service 109. For example, the policy 120a may identify metadata types associated with the application 116a for pushing to the unified service 109. For example, the policy 120 may identify data 112 associated with an application 116, a subset of the associated data 112, and criteria for pushing the metadata to the unified service 109. In some implementations, the policy 120 may include or otherwise identify one or more of the following: data 112; metadata types; application 116; criteria for pushing metadata; ECA (event-condition-action) or other information. In regards to criteria, the policy 120 may identify a time period for periodically pushing metadata, a trigger event such as an update to data 112, or other criteria. In some implementations, the policy 120 may govern any aspect of how data can flow between perimeters 110 such as when it can flow, from where it can flow in, to where it can flow out, what type of data can flow.

The wireless communication device 102 may be connected to multiple networks, such as the enterprise network 104a and the public network 104b. The enterprise network 104a is a network associated with an enterprise. The enterprise may comprise a corporate or business entity, a government body, a non-profit institution, or any other organization connected to the wireless communication device 102. The enterprise may be the owner 104 of the wireless communication device 102. Of course, the enterprise may also lease the wireless communication device 102 or may hire contractors or agents who are responsible for maintaining, configuring, controlling, and/or managing the wireless communication device 102. In the illustrated implementation, the networks 104 facilitate wireless and/or wireline communication with the wireless communication device 102. The networks 104 may communicate, for example, Internet Protocol (IP) packets, Frame Relay frames, Asynchronous Transfer Mode (ATM) cells, voice, video, data, and other suitable information between network addresses. In addition, while the enterprise network 104a and the public network 104b are each illustrated as a single network, each network 102 may comprise a plurality of networks. In short, the enterprise network 104a and the public network 104b are any suitable network that configured to communicate with the device 104.

Figure 2:
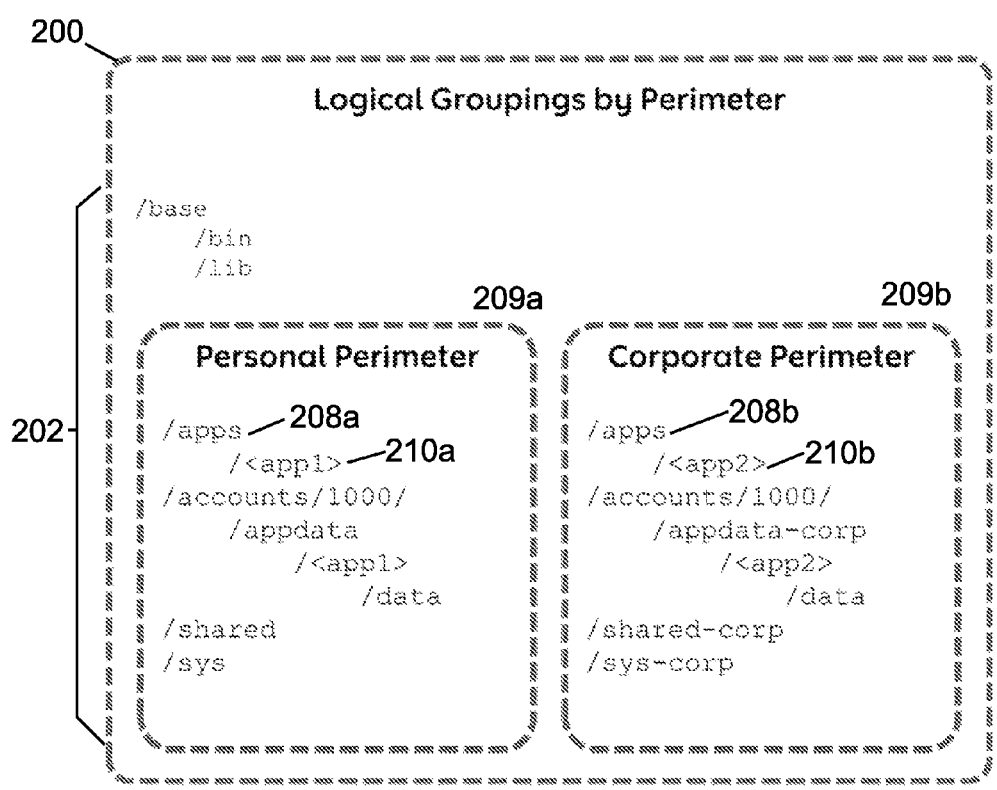
FIG. 2 is schematic diagram illustrating logical groupings by perimeter.

FIG. 2 illustrates an example device 200 including a perimeter file system resources 202 according to some implementations of the present disclosure. In these implementations, the device 200 includes a logical grouping by perimeter defined by perimeter policies such as a personal perimeter 209a and a corporate perimeter 209b. The perimeter file system resources 202 may use encryption, for example, a QNX encryption domain construct to secure assets. QNX is a commercial POSIX-complaint real-time operating system for embedded systems. The perimeter file system resources 202 may allow an administrator to indicate that assets may be stored unencrypted. For example, if a resource is designated to be shared, the perimeter file system resources 202 may indicate the resource is unencrypted.

In some implementations, the perimeter file system resources 202 may enable logical grouping of the file system resources such that the overarching application and account structure designed for the device 200 can be effectively partitioned by perimeters, such as the personal perimeter 209a and the corporate perimeter 209b. As illustrated, the grouped perimeters 210 and 220 may indicate information in the fields of application, application perimeter, user, target, target perimeter and permissions. As such, accessibility can be defined for each perimeter by describing the application to which the policy applies.

In some implementations, the application field 208a may include values 210a that indicate the personal perimeter 209a applies to all applications (i.e. for all authors, identifications, versions). Application-ID values 210a may indicate that the personal perimeter 209a applies to all versions of the specified application, the personal perimeter 209a applies to any application published by the specified author, the personal perimeter 209a applies to a specific version of the application, or others. Similarly, the application field 208b may include values 210b that indicate the corporate perimeter 209b applies to all applications (i.e. for all authors, identifications or versions), the corporate perimeter 209b applies to all versions of the specified application, the corporate perimeter 209b applies to any application published by the specified author, the corporate perimeter 209b applies to a specific version of the application, or others.

In some implementations, the device 200 may have an Application-Perimeter field describing whether the policy applies to applications within the perimeter (being local) or outside the perimeter (being external). A user field may enable description of whether the accessing policy applies to a specific user or all device users. A target field may enable definition of a file system path which can be used to specify which areas of the perimeter file system the policy applies to. The target field may not be required as the only area open for sharing has already been defined so that the target field may be useful when more open areas become available.

In some implementations, the device 200 may have a target-perimeter field that describes whether the perimeter policy applies to access of file system resources that are inside the perimeter (being local) or outside the perimeter (being external). A permissions field may describe what permissions the application described by the policy is allowed on the file system resource described by the policy.

Figure 3:
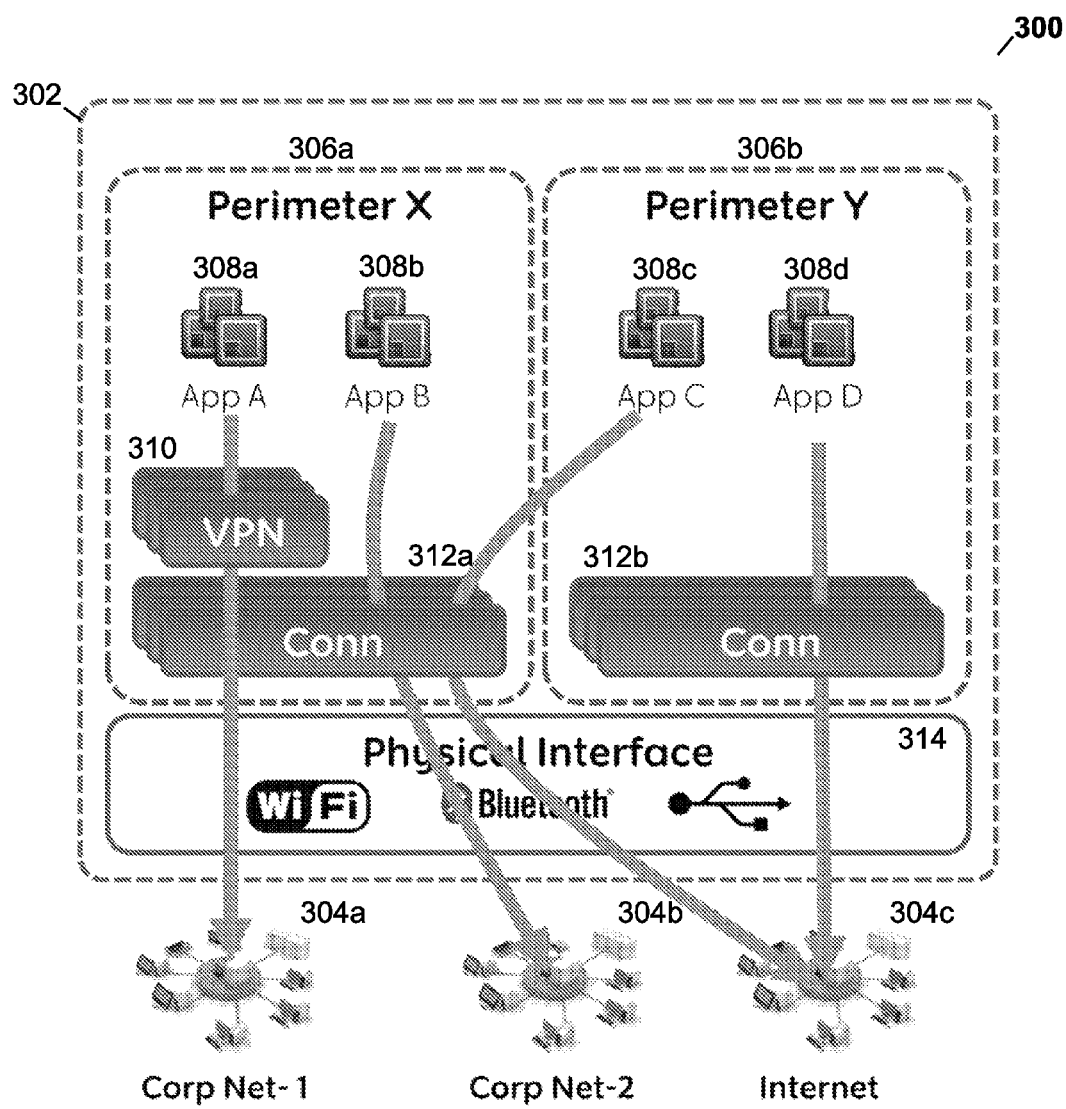
FIG. 3 is a schematic diagram illustrating access and communication across perimeters of a device.

FIG. 3 is a schematic diagram of an example system 300 illustrating access and communication across perimeters of network resources according to various embodiments of the present disclosure. In the illustrated implementation, the device 302 is configured to communicate with corporate networks 304a and 304b and the Internet 304c. The device 302 includes the perimeter 306a and the perimeter 306b. The perimeter 306a includes the applications 308a and 308b, and the perimeter 306b includes the applications 308c and 308d. The perimeter 306a may include a virtual private network 310 that securely connects the application 308a with the enterprise network 304a.

The perimeter 306a and the perimeter 306b may include the network access resource 312a and the network access resource 312b, respectively. The application 308b in the perimeter 306a connects to the enterprise network 304b through the connection 312a. In some implementations, the application 308c in the perimeter 306b crosses perimeters to access the resource or network access resource 312a in the perimeter 306a to connect to the internet 304c. For example, the application 308c may be a personal application (e.g., online game, social networking application) that access the internet 304c using the network access resources 312a of the perimeter 306a, which may be a corporate perimeter. The application 308d in the perimeter 306b connects to the internet 365 through the network access resource 312b in the perimeter 306b. All the aforementioned network connections 312 may be physically connected through a physical interface 314, which may use wireless, Bluetooth, Universal Serial Bus (USB), Radio Frequency Identification (RFID), Near Field Communication (NFC), or other connection technologies. In some implementations, the perimeter 306a may be a corporate perimeter, and the perimeter 306b may be a personal perimeter.

In summary, the schematic 300 illustrates cross-perimeter access using network resources. The perimeter configurations may define association between a connection and the underlying network(s) the perimeter exposes. The perimeter configuration may define association between a virtual private network and the underlying network(s) the perimeter exposes. The virtual private network and connection configuration may be stored inside a perimeter along with the policies that govern the network and configuration usage.

In some implementations, the perimeter network policy may include fields including an application, an application-perimeter, and a network field. For example, the application field may describe the application to which the policy is assigned. The application field may include values that indicate the perimeter may be applied to all applications regardless of author, id, and/or version. The application field may have an Author-ID value that indicates the perimeter may be applied to any application published by the specified author. The application field may have an Application-ID value that indicates the perimeter may be applied to all versions of the specified application. The application field may have an Application-Version-ID value that indicates the perimeter may be applied to a specific version of the application.

In some implementations, the device 300 may further include perimeter encryption policy, which may include fields such as the file system path, encryption, etc. The field for file system path may contain values that describe the area of the file system to which the policy applies. The values in the encryption field may describe whether the file system contents should be encrypted or unencrypted.

In some implementations, the perimeter network policy may include an application-perimeter field that describes whether the policy applies to applications within the perimeter, such as the perimeter 306a or the perimeter 306b, or outside the perimeter. A network field may further include values that describe what networks the policy is governing. For example, the values may show all networks are under the policy, all network defined in the perimeter, any network defined outside the perimeter, or a specific network defined in the perimeter.

The applications 308a-d may be assigned to the respective perimeter 306 that each has been assigned to at startup. For example, the applications 308a and 308b can be assigned to the perimeter 306a, and the applications 308c and 308d may be assigned to the perimeter 306b. In some implementations, these assignments cannot be changed in flight or after the system startup while the operating system is running. The perimeter 306 may define the environment available to each application, for example, the file directories, network resources, device capabilities, and others. In some implementations, running an application 308 in a corporate perimeter 306 can point the application 308 to a corporate repository. Applications are then installed and managed in the corporate perimeter 306.

An application may be installed into several perimeters 306 concurrently (e.g., different versions, different licenses, etc.). In these perimeters 306, each perimeter installation may follow its own lifecycle. The perimeter administrator, such as the administrator 108 as shown in FIG. 1, may use a policy to describe which applications may or may not be installed inside the administrated perimeter. When viewing an existing resource (e.g., a media file, an online streaming video, a website, etc.), the view application may be automatically launched in the appropriate perimeter 306.

In the applications 308 within certain perimeters 306, when creating content and/or launching an application that is not associated with a resource, the perimeter context is to be stated explicitly. In certain cases, applications 308 may be shared between perimeters 306. For example, the installation directory with binaries may not be encrypted for the applications 308 to be shared. The applications 308 may be shared to all users, the same user, and/or a specific device user. When application 308 is shared, there may not be any associated user data to be shared with the application 308. In some implementations, the applications 308 executing inside a perimeter 308 may not use inter-process communication to communicate with applications executing outside the perimeter.

Figure 4:
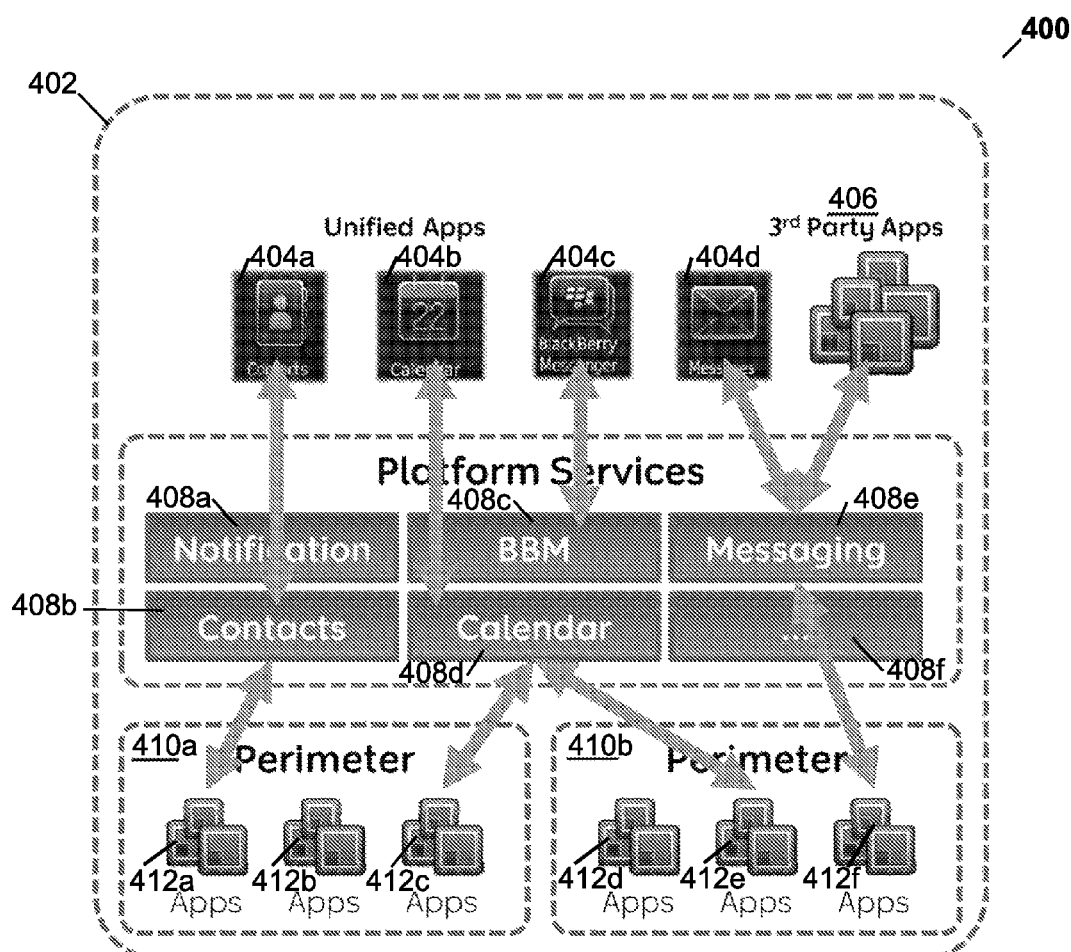
FIG. 4 is a schematic illustrating process for providing a unified view of metadata.

FIG. 4 is a schematic diagram of a system 400 illustrating access and communication across applications and platforms according to some implementations of the present disclosure. The device 402 includes a set of unified applications 404a-d and a set of third party applications 406. The device 402 further includes platform services 408a-f and perimeters 410a and 410b. The set of unified applications 404 and third-party applications 406 may directly communicate with the platform services 408. As illustrated, the unified applications 404 include a contacts application 404a, a calendar application 404b, a messenger application 404c, and a messaging application 404d. In some implementations, the unified applications 404 can provide a single seamless interface that presents the relevant data that is sourced across different perimeters as a single cohesive set. For example, the messaging application 404d may present a single unified access mechanism to email messages across all perimeters. The unified interface may also allow the user (and application) to deal with the data in a single way. For example, the user does not need to access multiple separate calendars in order to check availability across their personal and corporate events. A calendar unifying data across different perimeters may allow events to be presented together. The third party applications 406 may include any application provided by a third party, such as text editing applications, game applications, music or audio applications, multimedia applications, video editing applications, photo capture and editing applications, social media or social networking applications, shopping applications, news applications, a combination of any of the foregoing, or other applications.

The platform services 408 may include any software, hardware, or firmware configured to access different perimeters and provide retrieved data to the unified applications 410. The platform services 408 may include services for each type of service such as, for example, notifications, messaging, contacts, calendar, other digital assistance services, a combination of the foregoing or others. In some implementations, the device 402 may comprise a tablet computer (e.g., a PlayBook device) that integrates with specific experience. For example, the BlackBerry experience may permeate the device 402 and the perimeters 410 contained within. In these instances, the set of unified applications 404 may all be BlackBerry applications. Both the unified applications 404 and the third party applications 406 may be presented in a unified view that spans multiple perimeters 410 while minimizing or otherwise limiting data exposure.

The platform services 408 may span perimeters 410 and safeguard the perimeter data providing a unified view for both the unified applications 404 and the third party applications 406. For example, the graphical user interface may be governed by the platform services 408 that assemble display information without revealing the related data. The contacts 404a may be coupled with the contacts function in the platform services 408. The calendar 404b may be coupled with the calendar function in the platform services 408. The messenger 404c may be coupled with the messenger function in the platform services 408. The messages 404d and the third party applications 406 may both be coupled with the messaging function in the platform services 408.

In some implementations, the contacts function in the platform services 408 may correspond to the application 412a defined in the perimeter 410a. The calendar function in the platform services 408 may correspond to both the application 412c in the perimeter 410a and the application 412e in the perimeter 410b. The messaging function in the platform services 408 may correspond to the application 412f in the perimeter 410b. Therefore, the examples illustrated in FIG. 4 represent the various possibilities for the relationships established between applications and perimeters, and how the different relationships can be unified in the platform services 408 which reduce the data exposure.

For example, the calendar application 404a from each perimeter (there may be multiple perimeters that each define one calendar application 404a) can push limited calendar data to cross-perimeter calendar service (e.g., date, time, optional subject, etc.), such as the platform services 408. The device may then present a unified view of the scheduled events. The event viewers are then executed inside the perimeter associated with the event. In another example, a browser may use a common application perimeter model through which the network access is dependent on the perimeter in which it executes.

In some implementations, a unified platform service can be used to show unified list entries. The list entries may include messaging, notifications, calendar, contacts, and other lists alike. The device 402 may include multiple certificate stores. Each perimeter may have its own store that can be managed by an administrator. Applications assigned to the perimeter may use the certificates in the local store only.

In some implementations, the enterprise connectivity may only be active over virtual private networks. Certain core application management may be authorized to upgrade the system. Certain perimeter application management may upgrade the system. Some upgrades may include updates of the perimeter applications. Crossing various perimeters, data may be backed-up and restored under certain policy specified conditions.

Figure 5:
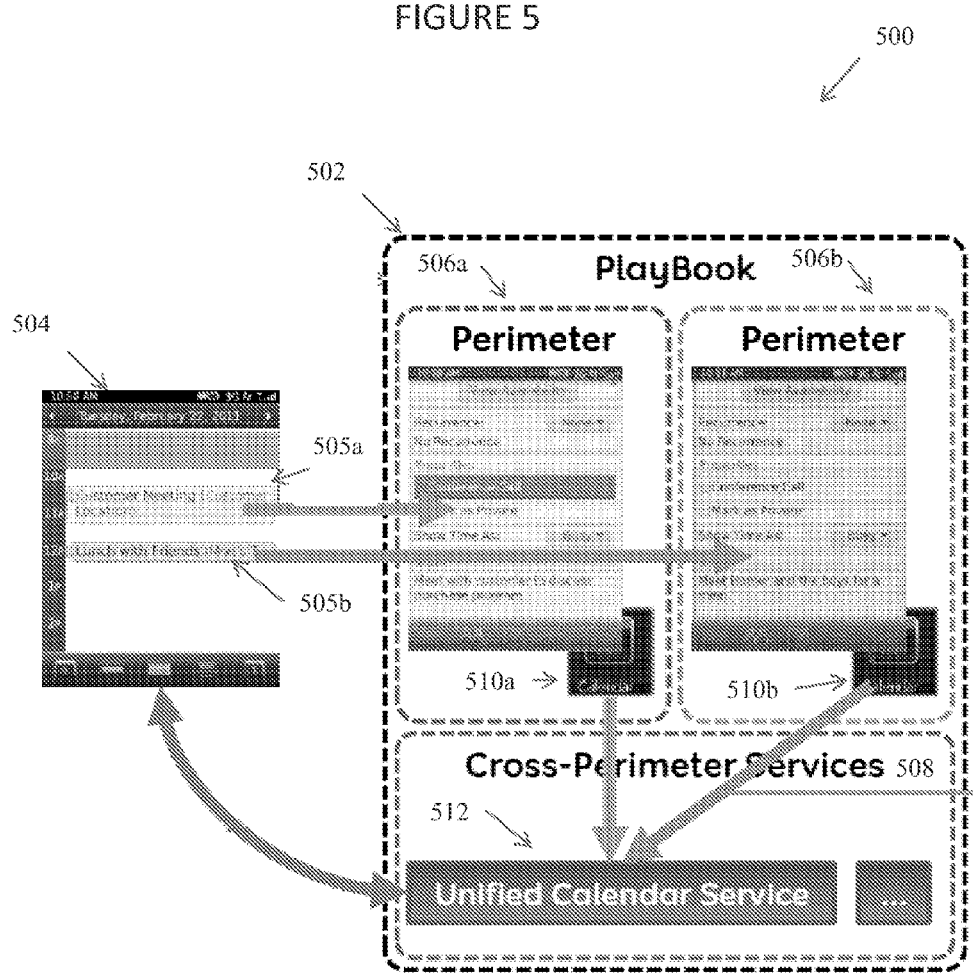
FIG. 5 is an example display illustrating a single interface presenting metadata from different perimeters.

FIG. 5 is a schematic 500 for presenting metadata from different perimeters 506a and 506b through a unified view 504. The device 502 includes the perimeters 506a and 506b that pushes metadata to the unified service 508. In particular, the perimeter 506a includes the calendar application 510a that pushes metadata (e.g., date, time) to the unified service 508, and, in addition, the perimeter 506b includes the calendar application 510b that pushes metadata (e.g., date, time) to the unified service 508. The applications 510a and 510b may push the data in response to an event such as data update, expiration of time period, or others. In addition, the applications 510a and 510b may include policies that identify a subset of data to push to the unified service 508. In connection with receiving metadata from different perimeters 506, the unified service 508 presents a display 504 including graphical elements 505a and 505b that conveys or otherwise identifies metadata from the calendar applications 510. The calendar is merely an example and the schematic may illustrate other unified services without departing from the disclosure. For example, the schematic 500 may include contact applications that merely push a name and a phone number to a unified service. Another example may include a messaging service that includes pushes a sender and a time of the message to a unified service.

Figure 6A:
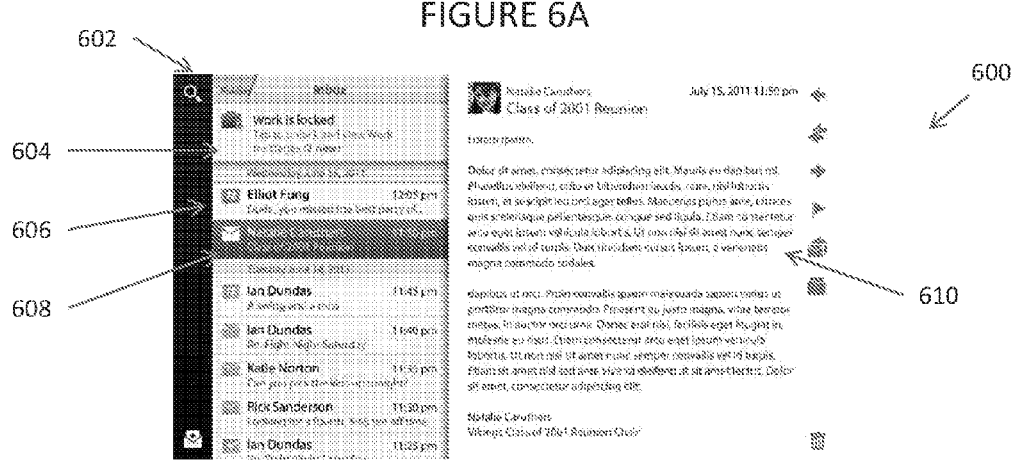
FIG. 6A-C illustrate views for unifying personal and work messages.
Figure 6B:
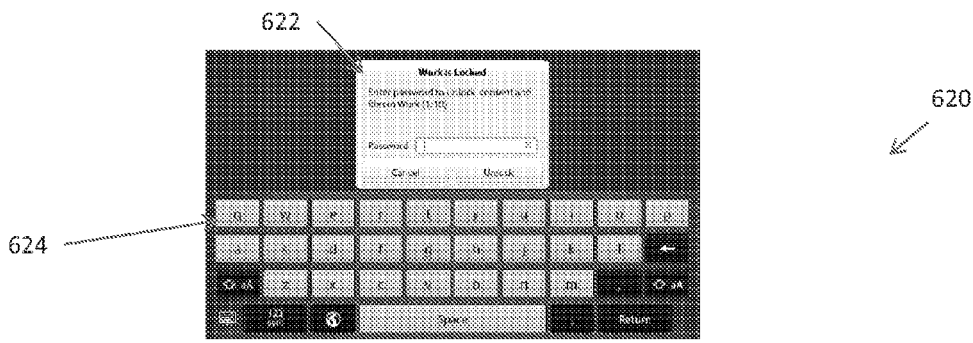
Figure 6C:

FIGS. 6A-C illustrate inbox views 600, 620, and 640 associated with presenting email metadata from different perimeters. Referring to FIG. 6A, the view 600 includes work element 604 and a message list 602. The work element 604 illustrates that two new messages from a work perimeter are available but currently locked. The work element 604 may update the new message count as messages are received by the work perimeter. In short, the work element 604 indicates that two messages from the work perimeter may be unified with the list 602 but are currently locked. In the illustrated implementation, the list 602 currently illustrates message metadata from a personal perimeter due to the locked messages, but the work element 604 is configured to allow access to accounts associated with the work perimeter in response to, for example, entering login information. In doing so, the view 600 may support email from both a personal perimeter and a work perimeter. In some instances, an email account may be associated with a work perimeter in one of two ways: (1) an administrator may explicitly create a perimeter over the air on the device and associated work accounts may be added automatically; and (2) a user may add an Active Sync account in account management, and if the IT Policy requests password protection, a work perimeter may be automatically created for the user. Referring to FIG. 6B, in response to a user selecting the work element 604, the view 620 presents a login message 622 and an associated keyboard 624 for entering a password. The login message 622 includes a field for entering the password to unlock the messages in the work perimeter and graphical buttons for either cancelling the request or submitting an entered password. Referring to FIG. 6C, the view 640 presents a unified view of messages through the list 606. As illustrated, the list 606 includes metadata for personal and work messages such as the work message 642. In particular, the list 606 indicates a sender, a time, date, and at least a portion of the subject line. Using the list 606, a user may view personal messages and work messages in a single view.

Figure 7A:
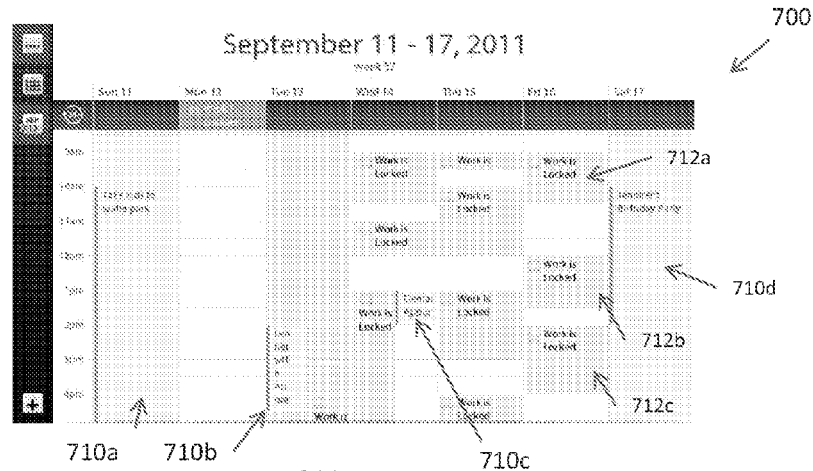
FIGS. 7A-C illustrate views for unifying personal and work appointments.
Figure 7B:
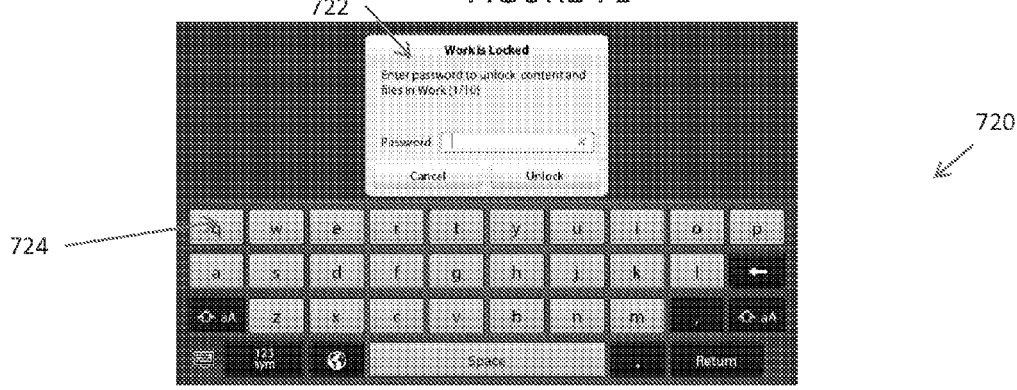
Figure 7C:
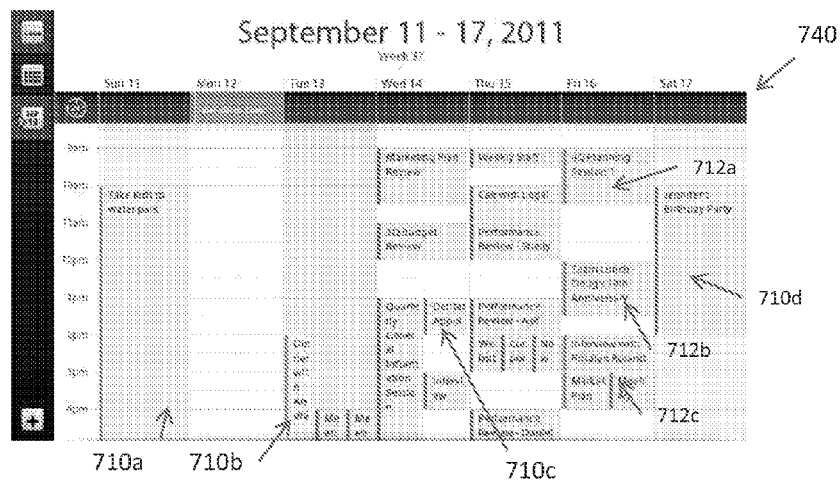

FIGS. 7A-C illustrate calendar views 700, 720, and 740 associated with presenting metadata of calendars from different perimeters. Referring to FIG. 6A, the unified calendar view 700 includes personal appointments 710a-d and work appointments 712a-c and a message list 602. The work appointments 712 illustrate several work appointments that are locked, i.e., information other the scheduled time is not presented (e.g., details such as location, invitees, and other meeting information are not presented). In some implementations, rather than merely illustrating that the work appointments 712 are locked, the appointments 612 may illustrate additional information such as the availability status (e.g., tentative, busy, out-of-office). The calendar view 700 may be updated as new appointments are scheduled in the work perimeter. Referring to FIG. 7B, in response to a user selecting a work appointment 712, the view 720 presents a login message 722 and an associated keyboard 724 for entering a password to access the calendar information from the work perimeter. The login message 722 includes a field for entering the password to unlock the calendar information in the work perimeter and graphical buttons for either cancelling the request or submitting a password entered in the field. Referring to FIG. 7C, the view 740 presents a unified view of appointments including both personal appointments 710 and work appointments 712. In particular, the view 740 includes metadata for personal and work appointments such as the participants and subject matter. Using the view 740, a user may view personal appointments and work appointments in the same view.

Figure 8A:
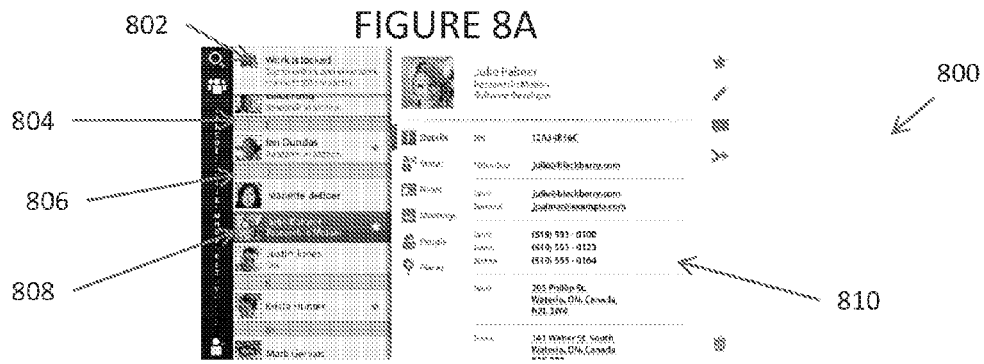
FIGS. 8A-C illustrate views for unifying personal and work contacts.
Figure 8B:
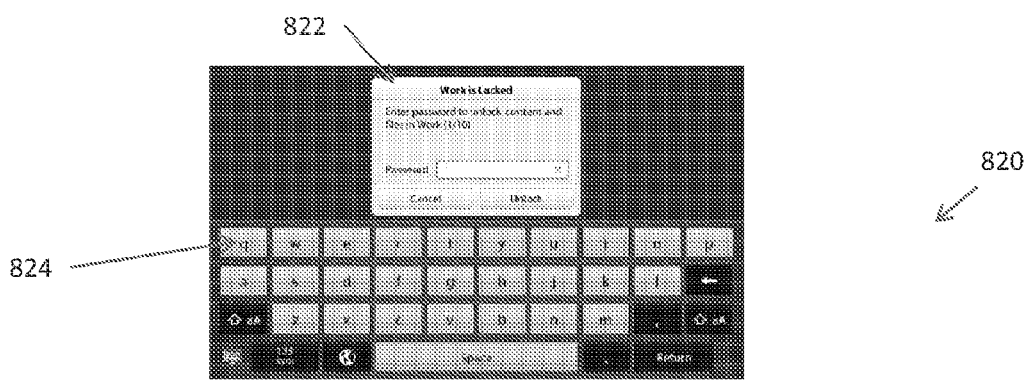
Figure 8C:

FIGS. 8A-C illustrate contact views 800, 820, and 840 associated with presenting metadata of contacts from different perimeters. Referring to FIG. 8A, the contact view 800 includes a work element 802 and a contact list 804. The work element 802 illustrates that 63 work contacts are available but currently locked. The work element 802 may update the new contact count as they are received by the work perimeter. In short, the work element 802 indicates that 63 contacts may be unified with the list 804 from the work perimeter but are currently locked. In the illustrated implementation, the list 804 currently illustrates contacts in a personal perimeter due to the locked contacts, but the work element 802 is configured to allow access to contacts in the work perimeter in response to, for example, correct login information. In doing so, the view 800 may support contacts from both personal and work perimeters. Referring to FIG. 8B, in response to a user selecting the work element 802, the view 820 presents a login message 822 and an associated keyboard 824 for entering a password to access the messages from the work perimeter. The login message 822 includes a field for entering the password and graphical buttons for either cancelling the request or submitting a password entered in the field. Referring to FIG. 8C, the view 840 presents a unified view of contacts through the list 804. As illustrated, the list 804 includes metadata for personal and work contacts such as the work contacts 842a-c. In particular, the list 804 may include a contact name, an associated company, a star indicator for favorites, an image, and other information. Using the list 804, a user may view personal contacts and work contacts using a single contact view 840.

Figure 9A:
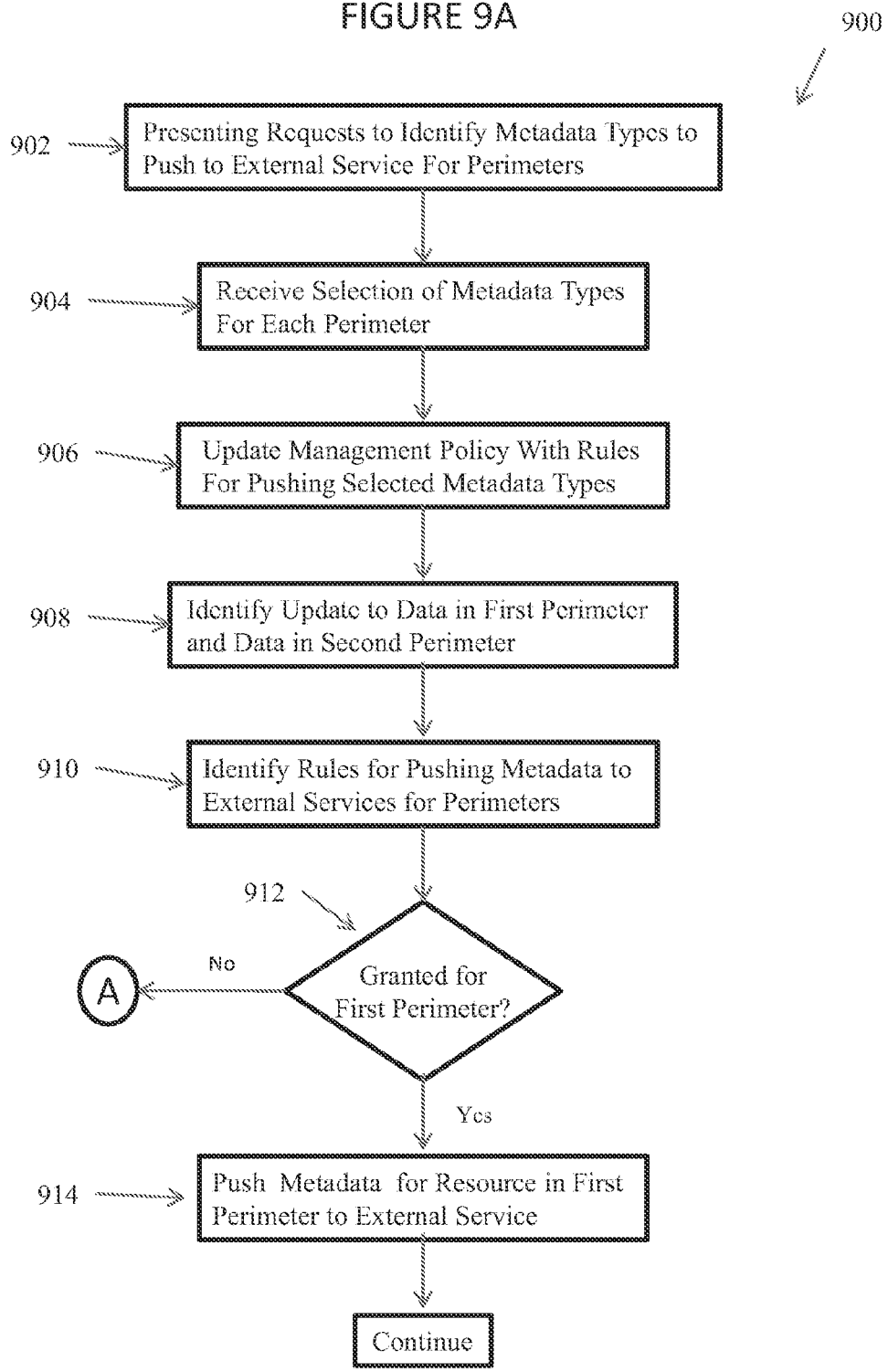
FIG. 9 is a flowchart showing an example process for presenting a unified view of metadata.
Figure 9B:
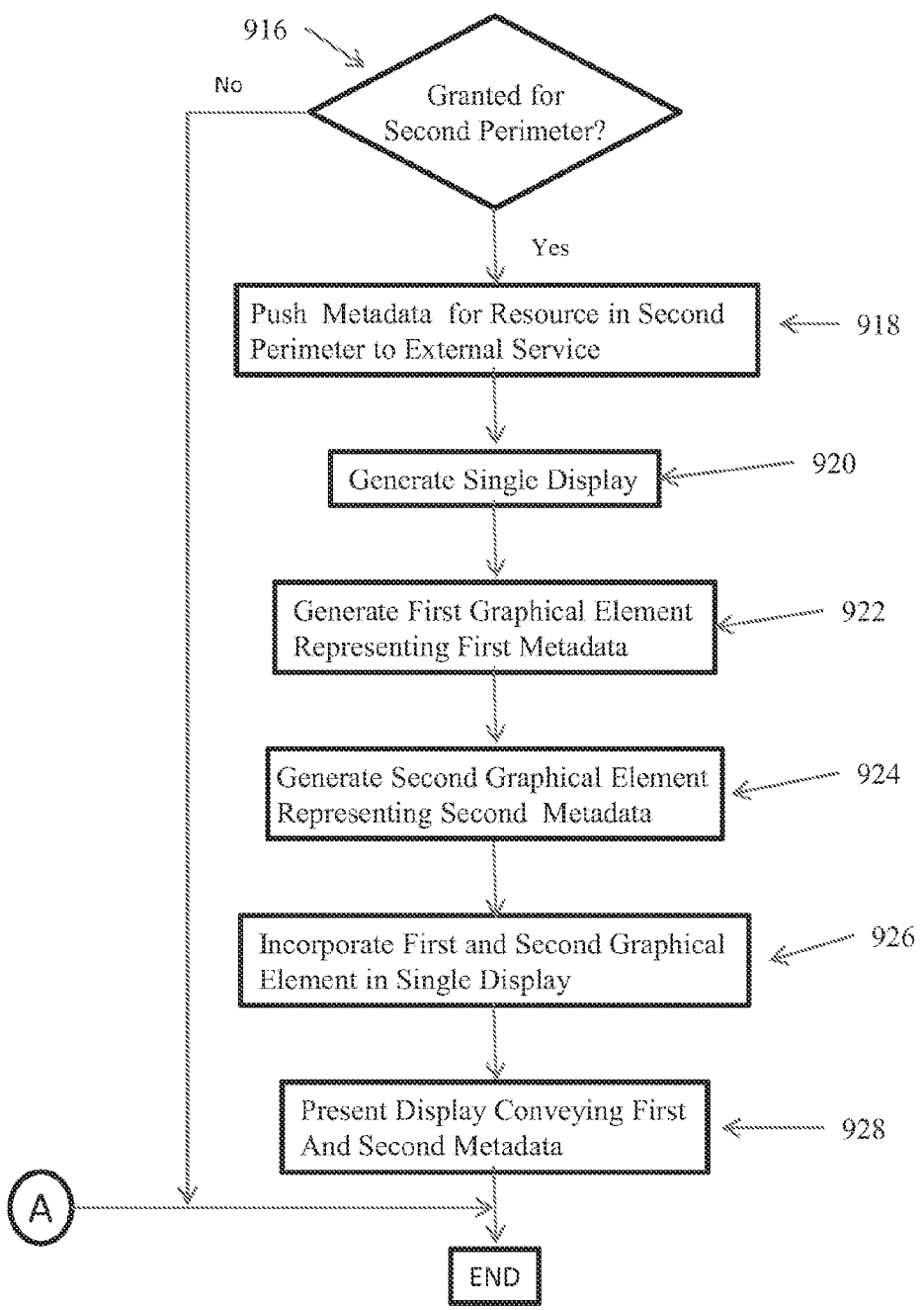

FIG. 9 is a flowchart illustrating an example method 900 for presenting data from different perimeters through a single unified view. In particular, the method 900 includes identifying management policies for each perimeter and determining whether to push metadata to a unified service based on the identified policies. This method is for illustration purposes only and that the described or similar techniques may be performed at any appropriate time, including concurrently, individually, or in combination. In addition, many of the steps in the flowchart may take place concurrently and/or in different orders than as shown. Moreover, systems may use methods with additional steps, fewer steps, and/or different steps, so long as the methods remain appropriate.

Method 900 begins at step 902 where a request to identify metadata types to push to an external unified service is presented in each perimeter. For example, each perimeter 110 in FIG. 1 that includes an application 116 providing the same type of service presents a request to identify metadata types to push to the unified service 109. The metadata types for each perimeter are received at step 904, and associated management policies are updated with the selected metadata types at step 906. In the example, the perimeter 110 may receive the metadata types and generate or update a policy 120 in accordance with the selection. In other words, the perimeter 110 may define one or more rules for pushing metadata to the unified service 109. Next, at step 908, updates to data in the first perimeter and the second perimeter are identified. As for the example, the perimeters 110 may determine that data 112 is updated such as receiving a scheduled appointment through the applications 116. In response to at least the update, rules for pushing metadata are identified at step 910. Returning to the example, the perimeter 110 identifies a policy 120 including rules for pushing metadata to the unified service 109.

If the policy grants pushing metadata to the unified service at decisional step 612, then, at step 914, metadata for the first resource in the first perimeter is pushed to the unified service. If the policy grants pushing metadata to the unified service at decisional step 916, then, at step 918, metadata for the second resource in the second perimeter is pushed to the unified service. Next, at step 920, a single display is generated. As for the example, the unified service 109 may generate a single interface for presenting combined metadata. At step 922, a first graphical element is generated representing first metadata. For example, the unified service 512 in FIG. 5 generates a first graphical element 504a identifying first metadata such as a date and a time for an appointment. At step 924, a second graphical element is generated representing second metadata. For example, the unified service 512 generates a second graphical element 504b identifying second metadata such as a date and a time for an appointment. Next, at step 926, the first and second graphical elements are incorporated into the single display. As illustrated in FIG. 5, the unified service 512 populates the graphical elements 505a and 505b in the single display 505. At step 928, the display is presented conveying the first and second metadata. In the example, the graphical elements 505a and 505b identify the first metadata and the second metadata, respectively. Even though two perimeters are illustrated, the device may include three or more perimeters without departing from the scope of the disclosure.

A number of embodiments of the invention have been described. Nevertheless, it will be understood that various modifications may be made without departing from the spirit and scope of the invention. Accordingly, other embodiments are within the scope of the following claims.

What is claimed is:

1. A method for managing data in a user device, the method comprising:
pushing, to a service application of a user device, first metadata related to a personal resource associated with a personal perimeter of the user device, the service application being external to the personal perimeter, and the personal perimeter being configured to prevent resources of the user device external to the personal perimeter from accessing resources associated with the personal perimeter;
pushing, to the service application of the user device, second metadata related to a work resource associated with a work perimeter of the user device, the service application being external to the work perimeter, the work perimeter being configured to prevent resources of the user device external to the work perimeter from accessing resources associated with the work perimeter;
presenting, through a display of the user device, information based on a combination of the first metadata and the second metadata when the personal perimeter is unlocked and the work perimeter is unlocked; and
presenting, through the display, information based on a combination of the first metadata and a portion of the second metadata when the personal perimeter is unlocked and the work perimeter is locked, the portion of the second metadata being less than the second metadata used when the work perimeter is unlocked.

2. The method of claim 1, further comprising:
presenting a request to identify types of metadata for the work resource to push to the service application;
updating a management policy for the work resource associated with the work perimeter based on selected metadata types; and
selecting the second metadata for the work resource in accordance with the management policy.

3. The method of claim 1, further comprising:
receiving a request to update data for the work resource associated with the work perimeter; and
in response to the updated data, determining whether to push the second metadata associated with the updated data to the external service application based on a management policy for the work perimeter, the management policy defining one or more rules for pushing data to external service applications.

4. The method of claim 1, wherein presenting information comprises:
generating a presentation including the first metadata and the second metadata; and
displaying the presentation including the first metadata and the second metadata.

5. The method of claim 1, wherein the external service application comprises a calendar application, the first metadata being associated with a personal appointment, and the second metadata being associated with a work appointment.

6. The method of claim 5, wherein the first metadata only identifies a date and time for the personal appointment and the second metadata only identifies a date and a time for the work appointment.

7. The method of claim 1, wherein the service application comprises at least one of a notification application, a messaging application, a calendar application, or a contacts application.

8. The method of claim 1, wherein presenting information comprises:
generating a single interface for the service application;
generating a first graphical element conveying the first metadata;
generating a second graphical element conveying the second metadata; and
presenting the single interface including the first graphical element and the second graphical element.

9. A device, comprising:
a personal perimeter of the device assigned a personal resource, the personal perimeter being configured to prevent resources of the device external to the personal perimeter from accessing resources associated with the personal perimeter;
a work perimeter of the device assigned a work resource, the work perimeter being configured to prevent resources of the device external to the work perimeter from accessing resources associated with the work perimeter; and
one or more processors operable to:
push, to a service application of a user device, first metadata related to a personal resource associated with a personal perimeter of the user device, the service application being external to the personal perimeter;

push, to the service application of the user device, second metadata related to a work resource associated with a work perimeter of the user device, the service application being external to the work perimeter;

present information based on a combination of the first metadata and the second metadata when the personal perimeter is unlocked and the work perimeter is unlocked; and present information based on a combination of the first metadata and a portion of the second metadata when the personal perimeter is unlocked and the work perimeter is locked, the portion of the second metadata being less than the second metadata used when the work perimeter is unlocked.

10. The device of claim 9, one or more processors further operable to:

present a request to identify types of metadata for the work resource to push to the service application;

update a management policy for the work resource associated with the work perimeter based on selected metadata types; and select the second metadata for the work resource in accordance with the management policy.

11. The device of claim 9, one or more processors further operable to:

receive a request to update data for the work resource associated with the work perimeter; and in response to the updated data, determine whether to push the second metadata associated with the updated data to the service application based on a management policy for the work perimeter, the management policy defining one or more rules for pushing data to service applications.

12. The device of claim 9, wherein one or more processors operable to present information comprises one or more processors operable to:

generate a presentation including the first metadata and the second metadata; and display the presentation including the first metadata and the second metadata.

13. The device of claim 9, wherein the service application comprises a calendar application, the first metadata being associated with a personal appointment, and the second metadata being associated with a work appointment.

14. The device of claim 13, wherein the first metadata only identifies a date and time for the personal appointment and the second metadata only identifies a date and a time for the work appointment.

15. The device of claim 9, wherein the service application comprises at least one of a notification application, a messaging application, a calendar application, or a contacts application.

16. The device of claim 9, wherein one or more processors operable to present information comprises one or more processors further operable to:

generate a single interface for the service application;

generate a first graphical element conveying the first metadata;

generate a second graphical element conveying the second metadata; and present the single interface including the first graphical element and the second graphical element.

17. A computer program product encoded on a non-transitory medium, the product comprising computer readable instructions for causing one or more processors to perform operations comprising:

pushing, to a service application of a user device, first metadata related to a personal resource associated with a personal perimeter of the user device, the service application being external to the personal perimeter, and the personal perimeter being configured to prevent resources of the user device external to the personal perimeter from accessing resources associated with the personal perimeter;

pushing, to the service application of the user device, second metadata related to a work resource associated with a work perimeter of the user device, the service application being external to the work perimeter, the work perimeter being configured to prevent resources of the user device external to the work perimeter from accessing resources in associated with the second work perimeter;

presenting, through a display of the user device, information based on a combination of the first metadata and the second metadata when the personal perimeter is unlocked and the work perimeter is unlocked; and presenting, through the display, information based on a combination of the first metadata and a portion of the second metadata when the personal perimeter is unlocked and the work perimeter is locked, the portion of the second metadata being less than the second metadata used when the work perimeter is unlocked.

18. The computer program product of claim 17, the operations further comprising:

presenting a request to identify types of metadata for the work resource to push to the service application;

updating a management policy for the work resource associated with the work perimeter based on selected metadata types; and selecting the second metadata for the work resource in accordance with the management policy.

19. The computer program product of claim 17, the operations further comprising:

receiving a request to update data for the work resource associated with the work perimeter; and in response to the updated data, determining whether to push the second metadata associated with the updated data to the service application based on a management policy for the work perimeter, the management policy defining one or more rules for pushing data to service applications.

20. The computer program product of claim 17, wherein the operations comprising presenting information comprises the operations comprising:

generating a presentation including the first metadata and the second metadata; and displaying the presentation including the first metadata and the second metadata.

21. The computer program product of claim 17, wherein the service application comprises a calendar application, the first metadata being associated with a personal appointment, and the second metadata being associated with a work appointment.

22. The computer program product of claim 21, wherein the first metadata only identifies a date and time for the personal appointment and the second metadata only identifies a date and a time for the work appointment.

23. The computer program product of claim 17, wherein the service application comprises at least one of a notification application, a messaging application, a calendar application, or a contacts application.

24. The computer program product of claim 17, wherein the operations comprising presenting information comprises the operations comprising:
- generating a single interface for the service application;
- generating a first graphical element conveying the first metadata;
- generating a second graphical element conveying the second metadata; and
- presenting the single interface including the first graphical element and the second graphical element.

* * * * *

UNITED STATES PATENT AND TRADEMARK OFFICE
CERTIFICATE OF CORRECTION

| | | |
|---|---|---|
| PATENT NO. | : 8,799,227 B2 | Page 1 of 1 |
| APPLICATION NO. | : 13/398676 | |
| DATED | : August 5, 2014 | |
| INVENTOR(S) | : Geordon Thomas Ferguson et al. | |

It is certified that error appears in the above-identified patent and that said Letters Patent is hereby corrected as shown below:

On the Title Page

Page 3, Column 2, References Cited (Other Publications), Line 44, Delete "201O" and insert -- 2010 --, therefor.

Page 3, Column 2, References Cited (Other Publications), Line 58, Delete "Internationl" and insert -- International --, therefor.

In the Claims

Column 16, Line 16, In Claim 17, after "resources" delete "in".

Column 16, Line 16, In Claim 17, after "the" delete "second".

Signed and Sealed this
Twenty-first Day of October, 2014

Michelle K. Lee
*Deputy Director of the United States Patent and Trademark Office*